US011420372B2

(12) United States Patent
Yuwaki

(10) Patent No.: US 11,420,372 B2
(45) Date of Patent: Aug. 23, 2022

(54) FLOW RATE ADJUSTING DEVICE, THREE-DIMENSIONAL SHAPING DEVICE, AND INJECTION MOLDING DEVICE

(71) Applicant: Seiko Epson Corporation, Tokyo (JP)

(72) Inventor: Kohei Yuwaki, Tsukuba (JP)

(73) Assignee: Seiko Epson Corporation

( * ) Notice: Subject to any disclaimer, the term of this patent is extended or adjusted under 35 U.S.C. 154(b) by 159 days.

(21) Appl. No.: 16/906,027

(22) Filed: Jun. 19, 2020

(65) Prior Publication Data

US 2020/0398469 A1 Dec. 24, 2020

(30) Foreign Application Priority Data

Jun. 21, 2019 (JP) .............................. JP2019-115387

(51) Int. Cl.
*B29C 45/77* (2006.01)
*B29C 45/23* (2006.01)
(Continued)

(52) U.S. Cl.
CPC ............ *B29C 45/77* (2013.01); *B29C 45/234* (2013.01); *B29C 45/47* (2013.01); *B29C 45/60* (2013.01)

(58) Field of Classification Search
CPC ....... B29C 45/77; B29C 45/234; B29C 45/47; B29C 45/60; B29C 45/464; B29C 64/321; B29B 7/401; B29B 7/408
See application file for complete search history.

(56) References Cited

U.S. PATENT DOCUMENTS 5,747,077 A * 5/1998 Yoshida .............. B29C 48/0022
425/183
2017/0210069 A1* 7/2017 Stubenruss ........... B29C 64/118
(Continued)

FOREIGN PATENT DOCUMENTS

JP 2006123357 A * 5/2006
JP 2018-051479 A 4/2018
(Continued)

*Primary Examiner* — Kelly M Gambetta
*Assistant Examiner* — Virak Nguon
(74) *Attorney, Agent, or Firm* — Harness, Dickey & Pierce, P.L.C.

(57) ABSTRACT

A flow rate adjusting device includes a main body portion having a first opening portion to which a molten material is supplied, a second opening portion from which the molten material is discharged, a supply flow path communicating with the first opening portion and the second opening portion, and a cross hole intersecting the supply flow path; and a shaft-shaped valve portion disposed inside the cross hole. The valve portion has a tip end portion, a rear end portion, and a recessed portion provided between the tip end portion and the rear end portion and communicating with the first opening portion and the second opening portion, and the valve portion is rotated in the cross hole to change a position of the recessed portion, such that a flow path cross-sectional area of the supply flow path is changed to adjust a flow rate of the molten material discharged from the second opening portion; a storage chamber storing a part of the molten material flowing through the supply flow path between the first opening portion and the valve portion is defined by the tip end portion and an inner wall surface of the cross hole; the valve portion has a first contact surface provided between the recessed portion and the rear end portion and facing the rear end portion side; and the main body portion has a second contact surface to come into contact with the first contact surface from the tip end portion side.

5 Claims, 13 Drawing Sheets

(51) Int. Cl.
    *B29C 45/47*         (2006.01)
    *B29C 45/60*         (2006.01)

(56)            References Cited

U.S. PATENT DOCUMENTS

2018/0085777 A1*  3/2018  Sakai .................... B05C 5/0225
2019/0030820 A1   1/2019  Saito et al.

FOREIGN PATENT DOCUMENTS

JP      2019-025772 A    2/2019
WO    WO-2015135434 A1 *  9/2015  ........... B29C 64/106

* cited by examiner

FLOW RATE ADJUSTING DEVICE, THREE-DIMENSIONAL SHAPING DEVICE, AND INJECTION MOLDING DEVICE

The present application is based on, and claims priority from JP Application Serial Number 2019-115387, filed Jun. 21, 2019, the disclosure of which is hereby incorporated by reference herein in its entirety.

BACKGROUND

1. Technical Field

The present disclosure relates to a flow rate adjusting device, a three-dimensional shaping device, and an injection molding device.

2. Related Art

For example, JP-A-2019-025772 discloses a three-dimensional shaping device in which a discharge control mechanism that controls discharge of a molten material from a nozzle is provided in a flow path between a plasticization unit that melts the material and the nozzle that discharges the molten material. This discharge control mechanism controls the discharge of the molten material from the nozzle by opening and closing the flow path with a translational movement of a plate member.

In order to shape a shaped object with high dimensional accuracy, it is preferable that start and stop of the discharge of the molten material from the nozzle can be switched, as in the above device. When switching between the start and stop of the discharge of the molten material from the nozzle by using a mechanism that opens and closes the flow path by a translational movement and a rotational movement of a member, it is necessary to provide a clearance for moving the member smoothly. However, there is a possibility that the molten material leaks to an outside via the clearance. Therefore, there is a demand for a technique of preventing leakage of the molten material to the outside while ensuring the movement of the member.

SUMMARY

According to one aspect of the present disclosure, a flow rate adjusting device is provided. The flow rate adjusting device includes a main body portion having a first opening portion to which a molten material is supplied, a second opening portion from which the molten material is discharged, a supply flow path communicating with the first opening portion and the second opening portion and through which the molten material flows, and a cross hole intersecting the supply flow path; and a shaft-shaped valve portion disposed inside the cross hole. The valve portion has a tip end portion provided at one end of the valve portion, a rear end portion provided at the other end of the valve portion, and a recessed portion provided between the tip end portion and the rear end portion and communicating with the first opening portion and the second opening portion, and the valve portion is rotated in the cross hole to change a position of the recessed portion, such that a flow path cross-sectional area of the supply flow path is changed to adjust a flow rate of the molten material discharged from the second opening portion; a storage chamber storing a part of the molten material flowing through the supply flow path between the first opening portion and the valve portion is defined by the tip end portion and an inner wall surface of the cross hole; the valve portion has a first contact surface provided between the recessed portion and the rear end portion and facing the rear end portion side; and the main body portion has a second contact surface to come into contact with the first contact surface from the tip end portion side.

DESCRIPTION OF EXEMPLARY EMBODIMENTS

A. First Embodiment

Figure 1:
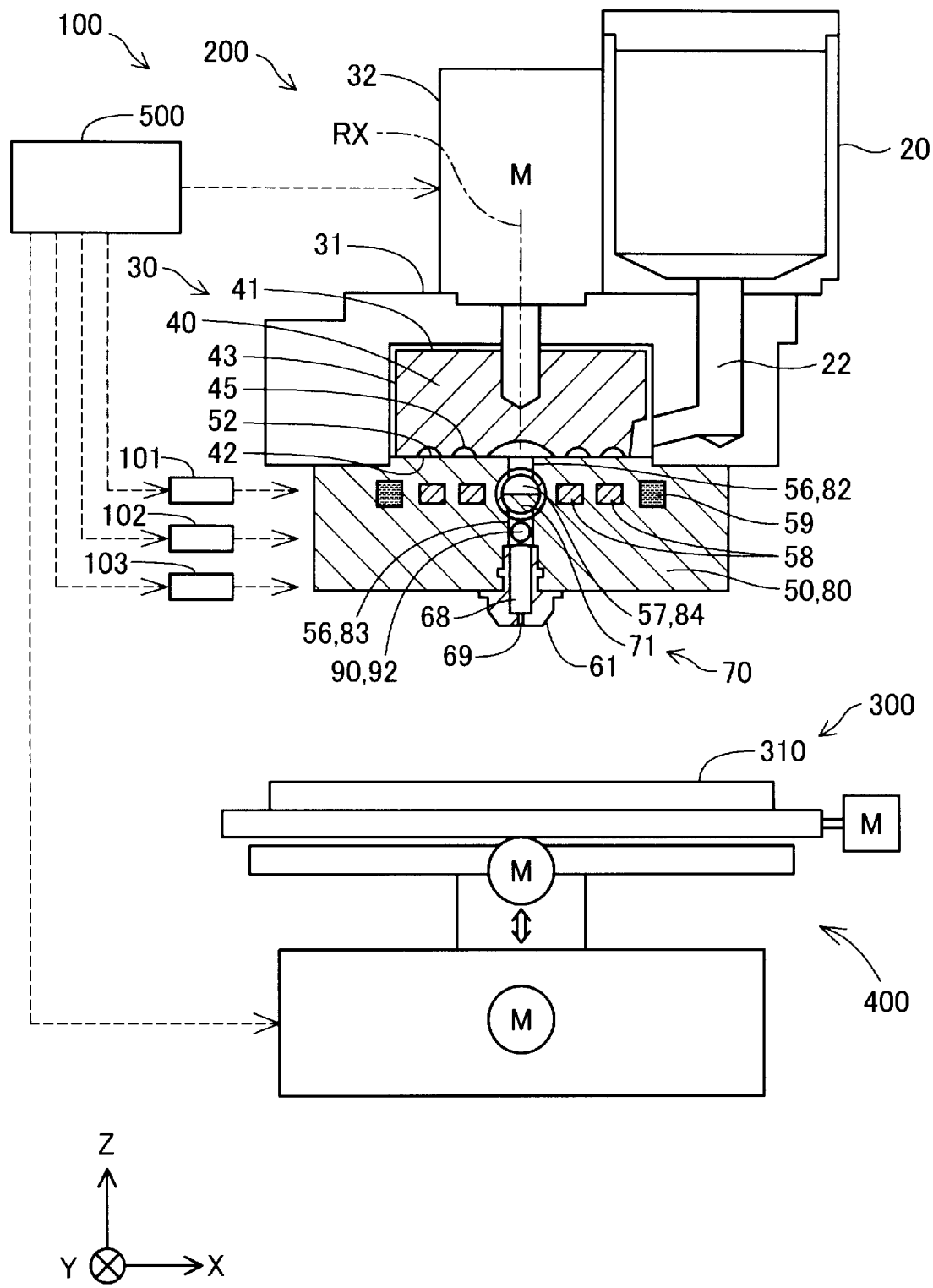
FIG. 1 is a diagram showing a schematic configuration of a three-dimensional shaping device according to a first embodiment.

FIG. 1 is a diagram showing a schematic configuration of a three-dimensional shaping device 100 according to a first embodiment. FIG. 1 shows arrows along X, Y, and Z directions orthogonal to each other. The X direction and the Y direction are directions along a horizontal direction, and the Z direction is a direction along a vertical direction. In other figures, the arrows along the X, Y, and Z directions are appropriately shown. The X, Y, Z directions in FIG. 1 and the X, Y, Z directions in other figures represent the same direction.

The three-dimensional shaping device 100 according to the present embodiment includes a shaping unit 200, a stage 300, a moving mechanism 400, and a control unit 500. Under control of the control unit 500, the three-dimensional shaping device 100 shapes a three-dimensional shaped object in which layers of a shaping material are stacked on a shaping surface 310 by driving the moving mechanism 400 to change a relative position between a nozzle hole 69 and the shaping surface 310 while discharging the shaping material from the nozzle hole 69 provided in the shaping unit 200 toward the shaping surface 310 of the stage 300. The shaping material is sometimes referred to as a molten material. A detailed configuration of the shaping unit 200 will be described later.

The moving mechanism 400 changes the relative position between the nozzle hole 69 and the shaping surface 310 as described above. According to the present embodiment, the moving mechanism 400 changes the relative position between the nozzle hole 69 and the shaping surface 310 by moving the stage 300 with respect to the shaping unit 200. The moving mechanism 400 according to the present embodiment is implemented by a three-axis positioner that moves the stage 300 in three axial directions of the X, Y, and Z directions by drive forces of three motors. Each motor is driven under the control of the control unit 500. The moving mechanism 400 may be configured to change the relative position between the nozzle hole 69 and the shaping surface 310 by, instead of moving the stage 300, but moving the shaping unit 200 without moving the stage 300. In addition, the moving mechanism 400 may be configured to change the relative position between the nozzle hole 69 and the shaping surface 310 by moving both the stage 300 and the shaping unit 200.

The control unit 500 is implemented by a computer including one or more processors, a main storage device, and an input and output interface for inputting and outputting signals to and from the outside. According to the present embodiment, the control unit 500 controls operations of the shaping unit 200 and the moving mechanism 400 by the processor executing a program or a command read in the main storage device, so as to execute a shaping processing for shaping a three-dimensional shaped object. The operations include changing a three-dimensional relative position between the shaping unit 200 and the stage 300. The control unit 500 may also be implemented by a combination of a plurality of circuits instead of a computer.

The shaping unit 200 includes a material supply unit 20 that is a supply source of a material, a plasticization unit 30 plasticizing the material supplied from the material supply unit 20 into a shaping material, a nozzle 61 having the nozzle hole 69 that discharges the shaping material supplied from the plasticization unit 30, a flow rate adjusting portion 70 adjusting a flow rate of the shaping material supplied to the nozzle 61, and a suction portion 90 sucking the shaping material. The "plasticization" means that a material having thermoplasticity is heated and melted. The "melting" also means that a material having thermoplasticity is softened by being heated to a temperature equal to or higher than a glass transition point, and exhibits fluidity.

A material in a state of pellets, powder, or the like is accommodated in the material supply unit 20. According to the present embodiment, a pellet-shaped ABS resin is used as the material. The material supply unit 20 according to the present embodiment is implemented by a hopper. Below the material supply unit 20, a supply path 22 that couples the material supply unit 20 and the plasticization unit 30 is provided. The material supply unit 20 supplies the material to the plasticization unit 30 via the supply path 22.

The plasticization unit 30 includes a screw case 31, a drive motor 32, a flat screw 40, and a barrel 50. The plasticization unit 30 melts at least a part of a solid-state material supplied from the material supply unit 20, converts the material into a paste-shaped shaping material having fluidity, and supplies the material to the nozzle 61.

The screw case 31 is a case for accommodating the flat screw 40. The barrel 50 is fixed to a lower surface of the screw case 31, and the flat screw 40 is accommodated in a space surrounded by the screw case 31 and the barrel 50. The drive motor 32 is fixed to an upper surface of the screw case 31. A rotation shaft of the drive motor 32 is coupled to the flat screw 40 on an upper surface 41 side. The drive motor 32 is driven under the control of the control unit 500.

The flat screw 40 has a substantially columnar shape whose height in a direction along a central axis RX is smaller than a diameter thereof. The flat screw 40 is disposed in the screw case 31 such that the central axis RX is parallel to the Z direction. The flat screw 40 rotates around the central axis RX in the screw case 31 due to a torque generated by the drive motor 32. The flat screw 40 includes a groove forming surface 42 at which groove portions 45 are formed on a side opposite to the upper surface 41 in the direction along the central axis RX. A specific configuration of the flat screw 40 on a groove forming surface 42 side will be described later.

The barrel 50 is disposed below the flat screw 40. The barrel 50 includes a screw facing surface 52 that faces the groove forming surface 42 of the flat screw 40. The barrel 50 is provided with a first through hole 56 that penetrates the barrel 50 along the Z direction, and a second through hole 57 that penetrates the barrel 50 along the Y direction so as to intersect the first through hole 56. The first through hole 56 forms a flow path for supplying the shaping material to the nozzle 61. This flow path is also referred to as a supply flow path. The first through hole 56 has one opening portion at a center of the screw facing surface 52, and has the other opening portion on a lower surface of the barrel 50. The shaping material flows into the first through hole 56 from the opening portion provided at the center of the screw facing surface 52, and flows out from the opening portion provided on the lower surface of the barrel 50. The opening portion of the first through hole 56 on an inflow side of the shaping material may be referred to as a first opening portion, and the opening portion of the first through hole 56 on an outflow side of the shaping material may be referred to as a second opening portion. A specific configuration of the barrel 50 on a screw facing surface 52 side will be described later.

The barrel 50 is provided with a heater 58 for heating a material supplied to the groove portion 45 of the flat screw 40. According to the present embodiment, four rod-shaped heaters 58 are disposed along the Y direction. The heaters 58 are disposed below the screw facing surface 52. A temperature of the heaters 58 are controlled by the control unit 500. The heater 58 may be referred to as a heating portion.

A refrigerant pipe 59 through which a refrigerant flows is provided in the barrel 50 at a position farther from the first through hole 56 than the heater 58. The refrigerant pipe 59 is disposed so as to pass through a vicinity of an outer peripheral edge of the screw facing surface 52. The refrigerant pipe 59 is coupled to a refrigerant pump 103. The refrigerant pump 103 supplies the refrigerant to the refrigerant pipe 59. The refrigerant pump 103 is driven under the control of the control unit 500. As the refrigerant, for example, a liquid such as water or oil, or a gas such as carbon dioxide can be used. When the refrigerant flows through the refrigerant pipe 59, it is possible to prevent temperatures of the flat screw 40 and the barrel 50 from becoming too high. The refrigerant pipe 59 and the refrigerant pump 103 may be referred to as a cooling portion.

According to the present embodiment, the flow rate adjusting portion 70 is provided in the plasticization unit 30. The flow rate adjusting portion 70 includes a main body portion 80, a valve portion 71, and a valve drive unit 101. According to the present embodiment, the barrel 50 has a function as the main body portion 80. The valve portion 71 is provided in the second through hole 57 of the barrel 50. The valve portion 71 adjusts the flow rate of the shaping material supplied to the nozzle 61 by rotating in the second through hole 57. The valve drive unit 101 is implemented by an actuator such as a stepping motor, and rotates the valve portion 71 under the control of the control unit 500. Among flow paths of the main body portion 80, a portion closer to the screw facing surface 52 than the valve portion 71 is referred to as a first flow path 82, and a portion farther from the screw facing surface 52 than the valve portion 71 is referred to as a second flow path 83. According to the present embodiment, in the first through hole 56 of the barrel 50, the portion closer to the screw facing surface 52 than the valve portion 71 is referred to as the first flow path 82, and the portion farther from the screw facing surface 52 than the valve portion 71 is referred to as the second flow path 83. The suction portion 90 is coupled to the second flow path 83. The suction portion 90 sucks the shaping material from the second flow path 83. The flow rate of the shaping material discharged from the nozzle 61 is also referred to as a discharge amount. A specific configuration of the flow rate adjusting portion 70 and a specific configuration of the suction portion 90 will be described later.

The nozzle 61 is coupled to the lower surface of the barrel 50. The nozzle 61 is provided with a nozzle flow path 68 and the nozzle hole 69. The nozzle flow path 68 is a flow path provided in the nozzle 61. The nozzle flow path 68 is coupled to the second flow path 83. The nozzle hole 69 is a portion in which a flow path cross section provided at an end portion on a side of the nozzle flow path 68 communicating with atmosphere is reduced. The shaping material flowing to the nozzle flow path 68 from the second flow path 83 is discharged from the nozzle hole 69. According to the present embodiment, an opening shape of the nozzle hole 69 is a circle. A diameter of an opening portion of the nozzle hole 69 is referred to as a nozzle diameter Dn. The opening shape of the nozzle hole 69 is not limited to a circle, and may be a square or the like. When the opening shape of the nozzle hole 69 is a square, a length of one side of the square is referred to as the nozzle diameter Dn. The opening shape of the nozzle hole 69 may be a polygon other than the square.

Figure 2:
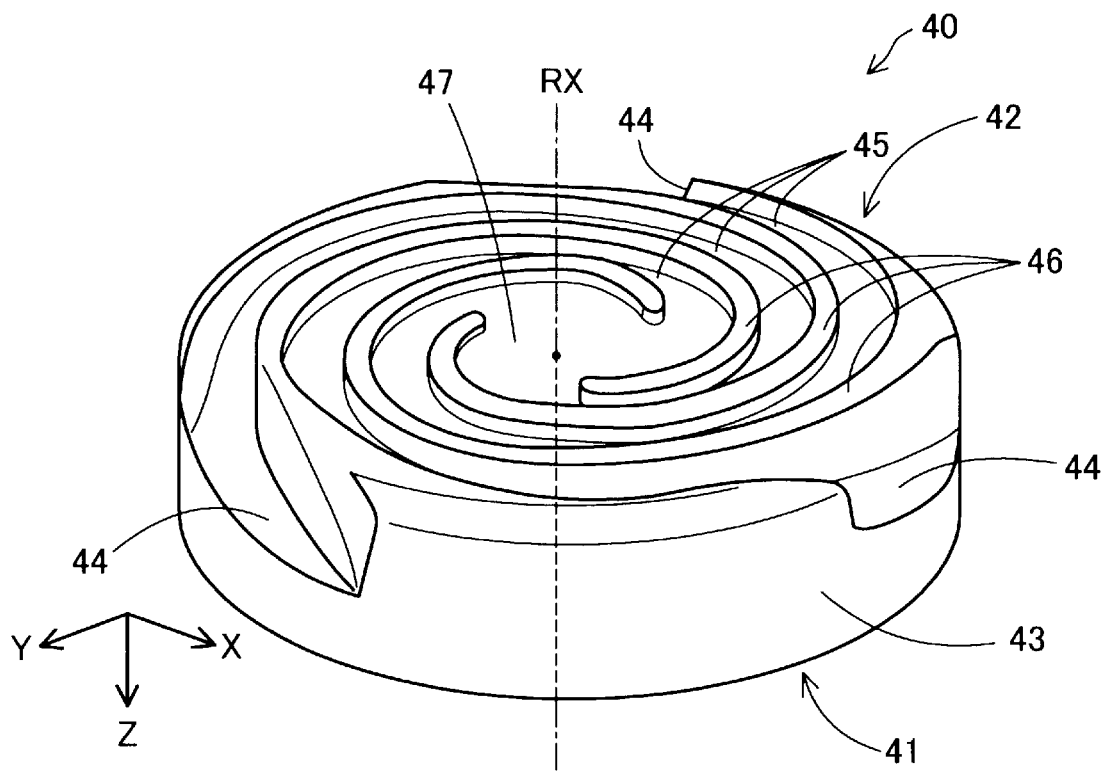
FIG. 2 is a schematic perspective view showing a configuration of a flat screw on a groove forming surface side.

FIG. 2 is a schematic perspective view showing the configuration of the flat screw 40 on the groove forming surface 42 side. In FIG. 2, a position of the central axis RX of the flat screw 40 is shown by a dashed line. As described with reference to FIG. 1, the groove portion 45 is provided in the groove forming surface 42.

A central portion 47 of the groove forming surface 42 of the flat screw 40 is implemented as a recess to which one end of the groove portion 45 is coupled. The central portion 47 faces the first through hole 56 of the barrel 50 shown in FIG. 1. The central portion 47 intersects the central axis RX.

The groove portion 45 of the flat screw 40 forms a so-called scroll groove. The groove portion 45 extends spirally from the central portion 47 toward an outer periphery of the flat screw 40 so as to draw an arc. The groove portion 45 may extend spirally. The groove forming surface 42 is provided with ridge portions 46 that form side wall portions of the groove portions 45 and extend along each of the groove portions 45.

The groove portion 45 extends to a material introduction port 44 formed in a side surface 43 of the flat screw 40. The material introduction port 44 is a portion that receives the material supplied via the supply path 22 of the material supply unit 20.

FIG. 2 shows an example of the flat screw 40 including three groove portions 45 and three ridge portions 46. The number of the groove portions 45 or the ridge portions 46 provided on the flat screw 40 is not limited to three. The flat screw 40 may be provided with only one groove portion 45, or may be provided with two or more groove portions 45. Any number of the ridge portions 46 may be provided in accordance with the number of the groove portions 45.

FIG. 2 illustrates an example of the flat screw 40 in which the material introduction ports 44 are formed at three places. The number of the material introduction ports 44 provided in the flat screw 40 is not limited to three. In the flat screw 40, the material introduction port 44 may be provided at only one place, or may be provided at two or more places.

Figure 3:
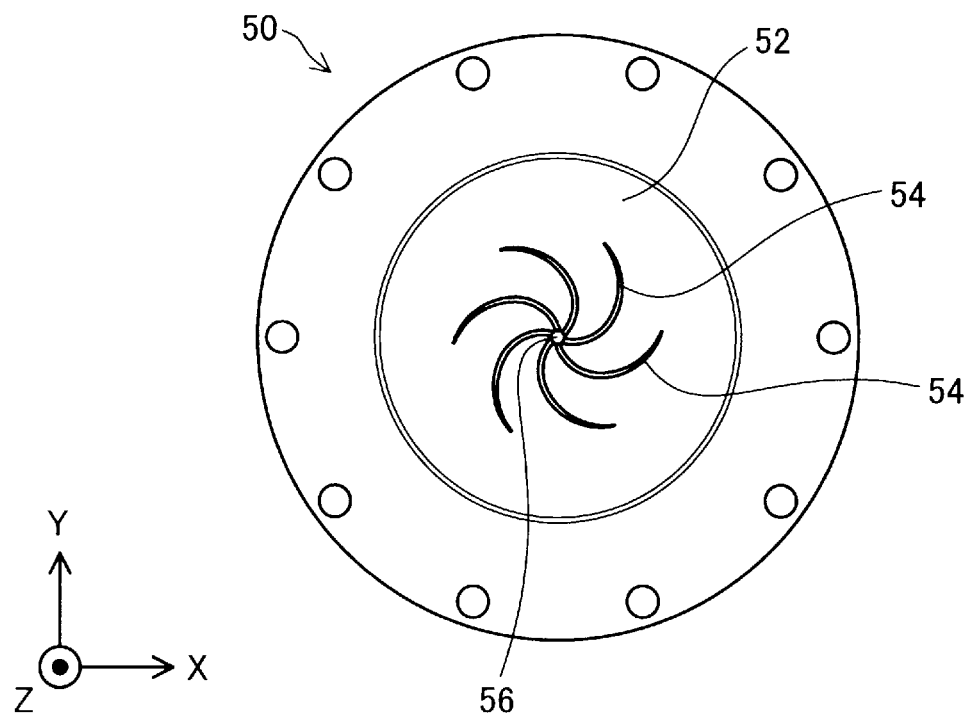
FIG. 3 is a top view showing a configuration of a barrel on a screw facing surface side.

FIG. 3 is a top view showing the configuration of the barrel 50 on the screw facing surface 52 side. As described above, the first through hole 56 communicating with the nozzle 61 is formed at the center of the screw facing surface 52. A plurality of guide grooves 54 are formed around the first through hole 56 in the screw facing surface 52. One end of the guide groove 54 is coupled to the first through hole 56, and extends spirally from the first through hole 56 toward an outer periphery of the screw facing surface 52. The guide groove 54 has a function of guiding the shaping material to the first through hole 56.

Figure 4:
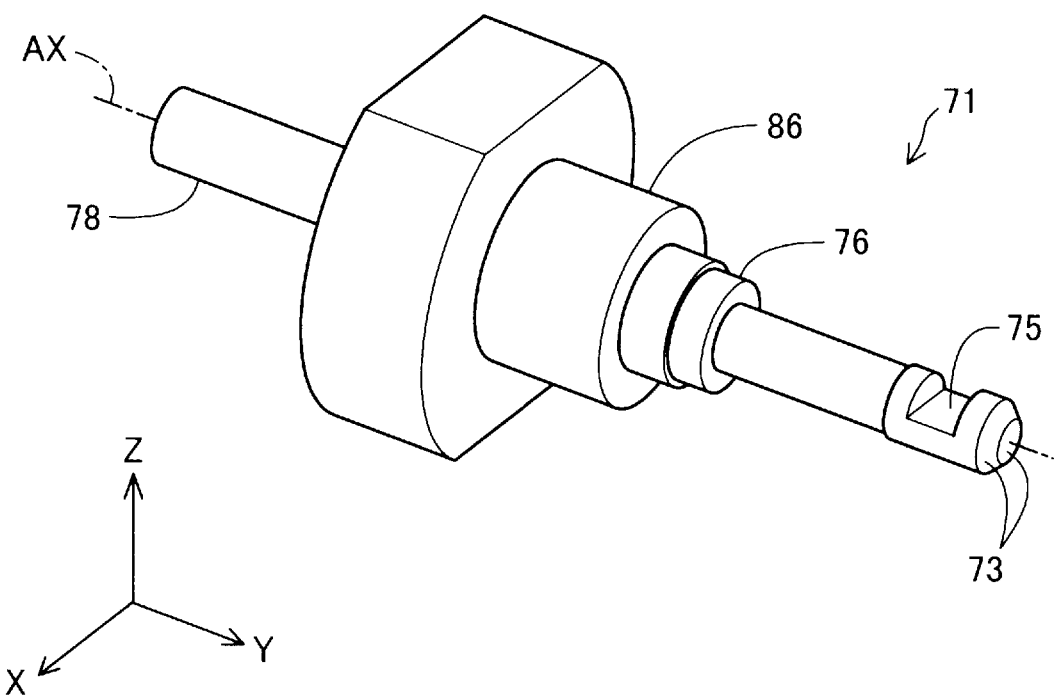
FIG. 4 is a first diagram showing a configuration of a valve portion of a flow rate adjusting portion.
Figure 5:
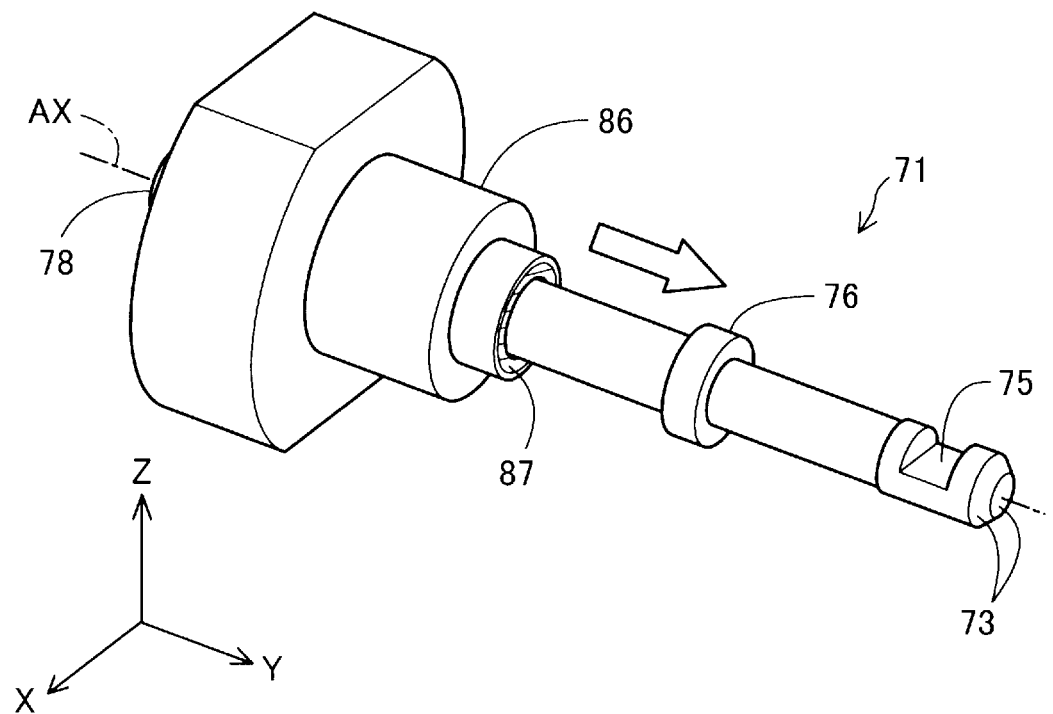
FIG. 5 is a second diagram showing the configuration of the valve portion of the flow rate adjusting portion.
Figure 6:
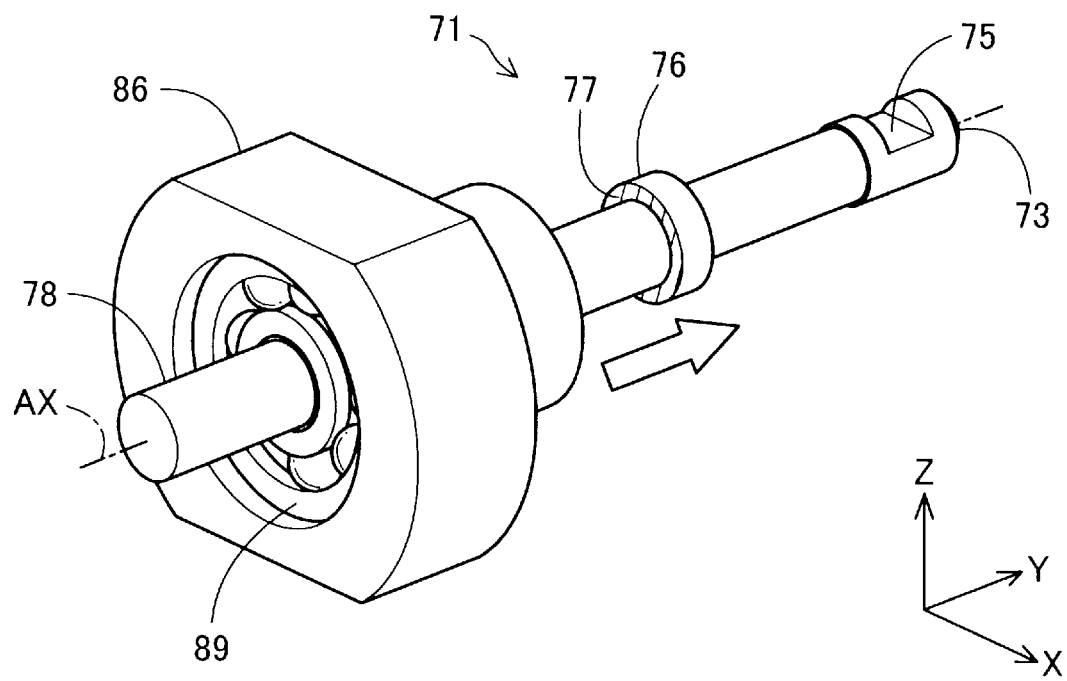
FIG. 6 is a third diagram showing the configuration of the valve portion of the flow rate adjusting portion.

FIG. 4 is a first diagram showing a configuration of the valve portion 71 of the flow rate adjusting portion 70. FIG. 5 is a second diagram showing the configuration of the valve portion 71 of the flow rate adjusting portion 70. FIG. 6 is a third diagram showing the configuration of the valve portion 71 of the flow rate adjusting portion 70. FIGS. 4 to 6 show a support portion 86 to be described later together with the valve portion 71. FIG. 4 shows the valve portion 71 supported by the support portion 86. FIGS. 5 and 6 show the valve portion 71 moved in a +Y direction from a position shown in FIG. 4, as indicated by the arrows. The valve portion 71 has a substantially columnar outer shape centered on a central axis AX. The valve portion 71 has a tip end portion 73, a recessed portion 75, a flange portion 76, and a rear end portion 78 in order from a +Y direction side.

The tip end portion 73 is provided at an end portion of the valve portion 71 on the +Y direction side. According to the present embodiment, the tip end portion 73 has a surface perpendicular to the Y direction and a portion where a corner portion of the columnar valve portion 71 is chamfered. The tip end portion 73 may not have the portion where the corner portion of the valve portion 71 is chamfered.

The recessed portion 75 is provided between the tip end portion 73 and the rear end portion 78 of the valve portion 71. The recessed portion 75 is formed by cutting out a half-moon shaped part of a side surface of the columnar valve portion 71. The recessed portion 75 is provided in a vicinity of the tip end portion 73. A distance along the Y direction from the tip end portion 73 to the recessed portion 75 is shorter than a distance along the Y direction from the flange portion 76 to the recessed portion 75. The recessed portion 75 may be provided by forming a through hole that intersects the central axis AX of the valve portion 71.

The flange portion 76 is provided between the recessed portion 75 and the rear end portion 78 of the valve portion 71. The flange portion 76 protrudes from the side surface of the columnar valve portion 71 toward directions perpendicular to the central axis AX. The flange portion 76 has a disk-shaped outer shape centered on the central axis AX. According to the present embodiment, a first contact surface 77 is provided on the flange portion 76 at a surface of the −Y direction side. The first contact surface 77 is provided so as to intersect in the Y direction. That is, the first contact surface 77 faces a rear end portion 78 side. The first contact surface 77 faces a second contact surface 87 provided on the support portion 86.

The rear end portion 78 is provided at an end portion of the valve portion 71 on the −Y direction side. The rear end portion 78 is coupled to the valve drive unit 101. When a torque from the valve drive unit 101 is applied to the rear end portion 78, the valve portion 71 rotates about the central axis AX.

The valve portion 71 is supported by the support portion 86 on a side surface between the flange portion 76 and the rear end portion 78. According to the present embodiment, the valve portion 71 is supported by the support portion 86 via a ball bearing 89. Therefore, the valve portion 71 can smoothly rotate about the central axis AX. The valve portion 71 is preferably formed of, for example, a material having a relatively high hardness, such as high-speed steel.

Figure 7:
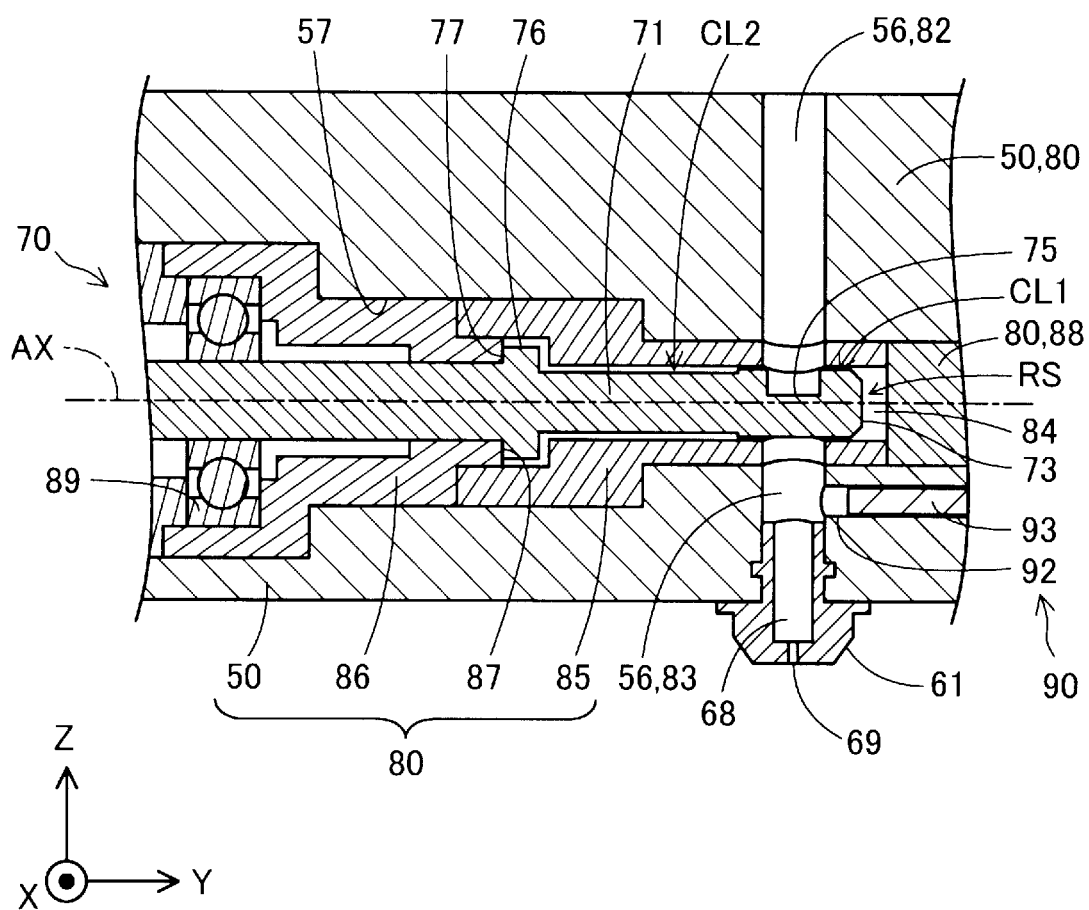
FIG. 7 is a diagram showing a configuration of the flow rate adjusting portion and a suction portion.

FIG. 7 is a diagram showing a configuration of the flow rate adjusting portion 70 and the suction portion 90. FIG. 7 shows the valve portion 71 accommodated in the barrel 50. The valve portion 71, a lid portion 88, a sliding portion 85, and the support portion 86 are accommodated in the second through hole 57 of the barrel 50. The lid portion 88, the sliding portion 85, and the support portion 86 are fixed to the barrel 50 by press-fitting. According to the present embodiment, the main body portion 80 of the flow rate adjusting portion 70 includes the barrel 50, the lid portion 88, the sliding portion 85, and the support portion 86.

The support portion 86 has a cylindrical outer shape. As described above, the support portion 86 supports the valve portion 71. The support portion 86 covers a part of the valve portion 71 closer to the rear end portion 78 side than the flange portion 76.

The sliding portion 85 has a cylindrical outer shape. The sliding portion 85 covers a part of the valve portion 71 from the tip end portion 73 to the flange portion 76. A hole that forms a part of the first flow path 82 and a hole that forms a part of the second flow path 83 are provided in the sliding portion 85 along the Z direction. An end portion of the support portion 86 on the +Y direction side is press-fitted to an end portion of the sliding portion 85 on the −Y direction side.

The lid portion 88 has a columnar outer shape. The lid portion 88 is provided near the +Y direction side than the tip end portion 73 in the second through hole 57. The lid portion 88 seals an opening portion of the second through hole 57 on the +Y direction side. An end portion of the sliding portion 85 on the +Y direction side is in contact with the lid portion 88.

The support portion 86 and the sliding portion 85 are preferably formed of a material having a higher hardness than the barrel 50. For example, high-speed steel may be used as the material of the support portion 86 and the sliding portion 85.

A cross hole 84 is defined by an inner wall surface of the support portion 86, an inner wall surface of the sliding portion 85, and the lid portion 88. The cross hole 84 extends along the Y direction intersecting with the first flow path 82 and the second flow path 83. The valve portion 71 is accommodated in the cross hole 84 such that the recessed portion 75 is located between the first flow path 82 and the second flow path 83. The valve portion 71 and the support portion 86 are engaged to be fitted or finely fitted. The valve portion 71 and the sliding portion 85 are engaged to be fitted or finely fitted. Therefore, a clearance is provided between the valve portion 71 and the support portion 86, and between the valve portion 71 and the sliding portion 85, such that the valve portion 71 is rotatable within the cross hole 84. A portion from the tip end portion 73 to the recessed portion 75 among the clearance between the valve portion 71 and the sliding portion 85 is referred to as a first clearance portion CL1, and a portion between the recessed portion 75 and the first contact surface 77 among the clearance between the valve portion 71 and the sliding portion 85 is referred to as a second clearance portion CL2. A length of the first clearance portion CL1 along the Y direction is shorter than a length of the second clearance portion CL2 in the Y direction. Therefore, a part of the shaping material flowing through the first flow path 82 is more likely to flow to the first clearance portion CL1 than the second clearance portion CL2.

A storage chamber RS storing the shaping material is defined by the tip end portion 73 of the valve portion 71, the inner wall surface of the sliding portion 85, and the lid portion 88. A part of the shaping material flowing through the first flow path 82 flows through the first clearance portion CL1 and is stored in the storage chamber RS. The tip end portion 73 receives pressure from the shaping material stored in the storage chamber RS toward the −Y direction. Therefore, the valve portion 71 is pushed toward the −Y direction, and the first contact surface 77 of the valve portion 71 comes into contact with the second contact surface 87 of the support portion 86. The contact between the first contact surface 77 and the second contact surface 87 improves sealing performance between the first contact surface 77 and the second contact surface 87. When the valve portion 71 rotates about the central axis AX, the first contact surface 77 slides on the second contact surface 87.

Even if the shaping material flows through the second clearance portion CL2 to the flange portion 76, since space between the first contact surface 77 and the second contact surface 87 is sealed, the shaping material is stored in the second clearance portion CL2. The flange portion 76 receives pressure from the shaping material stored in the second clearance portion CL2 toward the −Y direction. Therefore, the valve portion 71 is pushed more strongly toward the −Y direction, and the sealing performance between the first contact surface 77 and the second contact surface 87 is further improved.

Figure 8:
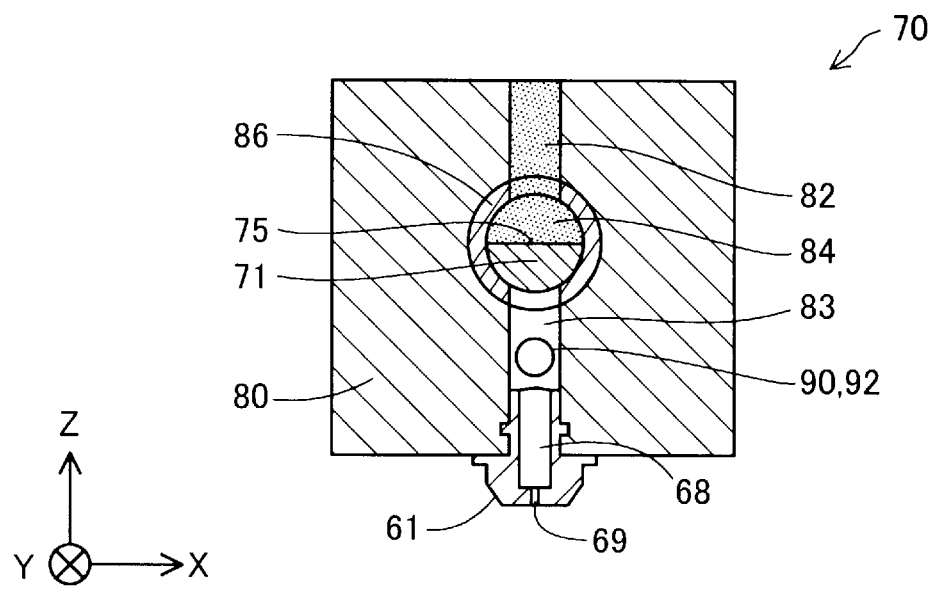
FIG. 8 is a first diagram showing an operation of the valve portion of the flow rate adjusting portion.
Figure 9:
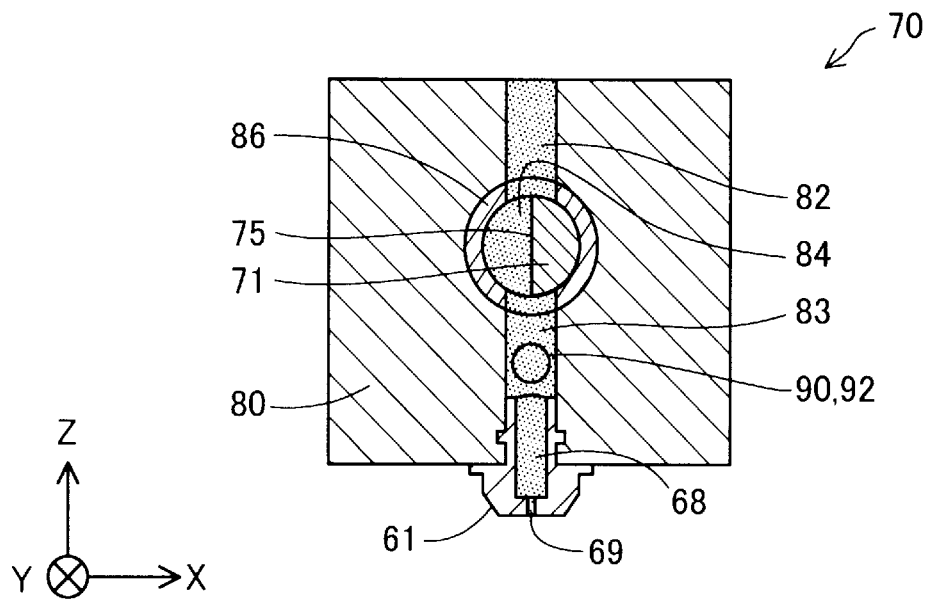
FIG. 9 is a second diagram showing an operation of the valve portion of the flow rate adjusting portion.

FIG. 8 is a first diagram showing an operation of the valve portion 71 of the flow rate adjusting portion 70. FIG. 9 is a second diagram showing an operation of the valve portion 71 of the flow rate adjusting portion 70. As shown in FIG. 8, when the valve portion 71 rotates such that the recessed portion 75 is located upward, the opening portion of the second flow path 83 is closed by the valve portion 71, and a flow of the shaping material from the first flow path 82 to the second flow path 83 is blocked. On the other hand, as shown in FIG. 9, when the valve portion 71 rotates such that the recessed portion 75 faces the +X direction or the −X direction, the first flow path 82 communicates with the second flow path 83, and the shaping material flows from the first flow path 82 to the second flow path 83 at a maximum flow rate. The valve portion 71 rotates about the central axis AX along the Y direction to change a position of the recessed portion 75, so that a flow path cross-sectional area between the first flow path 82 and the second flow path 83 is changed, and a flow rate of the shaping material flowing from the first flow path 82 to the second flow path 83 is adjusted.

Referring to FIG. 7, the suction portion 90 according to the present embodiment includes a cylindrical cylinder 92 provided in the barrel 50, a columnar plunger 93 accommodated in the cylinder 92, and a plunger drive unit 102 configured to move the plunger 93 within the cylinder 92. The cylinder 92 is coupled to the second flow path 83. The plunger drive unit 102 is implemented by a stepping motor driven under the control of the control unit 500, and a rack and pinion mechanism that converts a rotation of the stepping motor into a translational movement of the cylinder 92 along a central axis thereof. The plunger drive unit 102 may be implemented by the stepping motor driven under the control of the control unit 500, and a ball screw mechanism that converts the rotation of the stepping motor into the translational movement of the cylinder 92 along the central axis thereof, or may be implemented by an actuator such as a solenoid mechanism or a piezo element.

Figure 10:
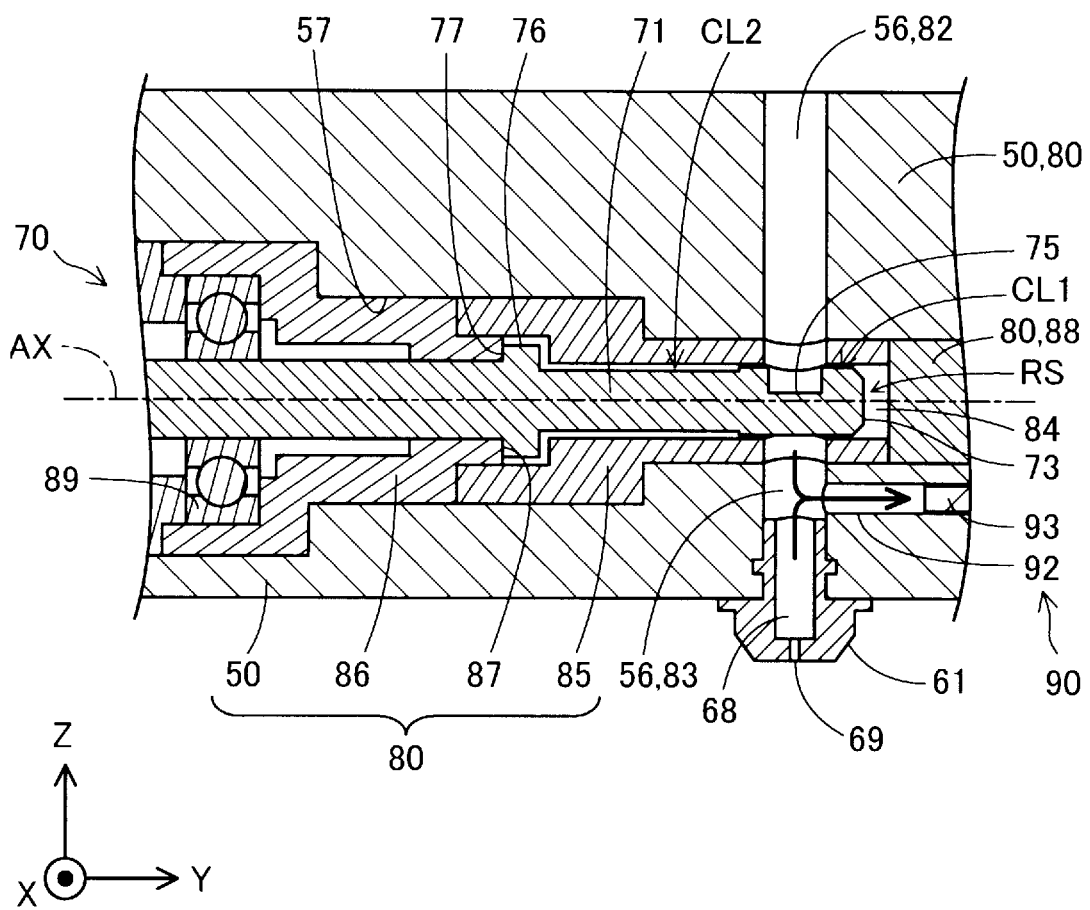
FIG. 10 is a diagram showing an operation of a plunger of the suction portion.

FIG. 10 is a diagram showing an operation of the plunger 93 of the suction portion 90. When the plunger 93 moves in a direction away from the second flow path 83, a negative pressure is generated in the cylinder 92, so that the shaping material in the second flow path 83 is drawn into the cylinder 92 as indicated by an arrow in FIG. 10. As the shaping material in the second flow path 83 is drawn into the cylinder 92, the shaping material in the nozzle 61 is drawn into the second flow path 83. Therefore, when discharge of the shaping material from the nozzle hole 69 is stopped, the shaping material in the second flow path 83 is sucked into the cylinder 92, so that the shaping material discharged from the nozzle hole 69 can be cut off. On the other hand, when the plunger 93 moves in a direction approaching the second flow path 83, the shaping material in the cylinder 92 is pushed out into the second flow path 83 by the plunger 93. Therefore, when the discharge of the shaping material from the nozzle hole 69 is restarted, a response of the discharge of the shaping material from the nozzle hole 69 can be enhanced by pushing the shaping material in the cylinder 92 out into the second flow path 83. Moving the plunger 93 in a direction in which the shaping material is pushed out from the cylinder 92 may be referred to as pushing the plunger 93. Moving the plunger 93 in a direction in which the shaping material is drawn into the cylinder 92 may be referred to as pulling the plunger 93.

Figure 11:
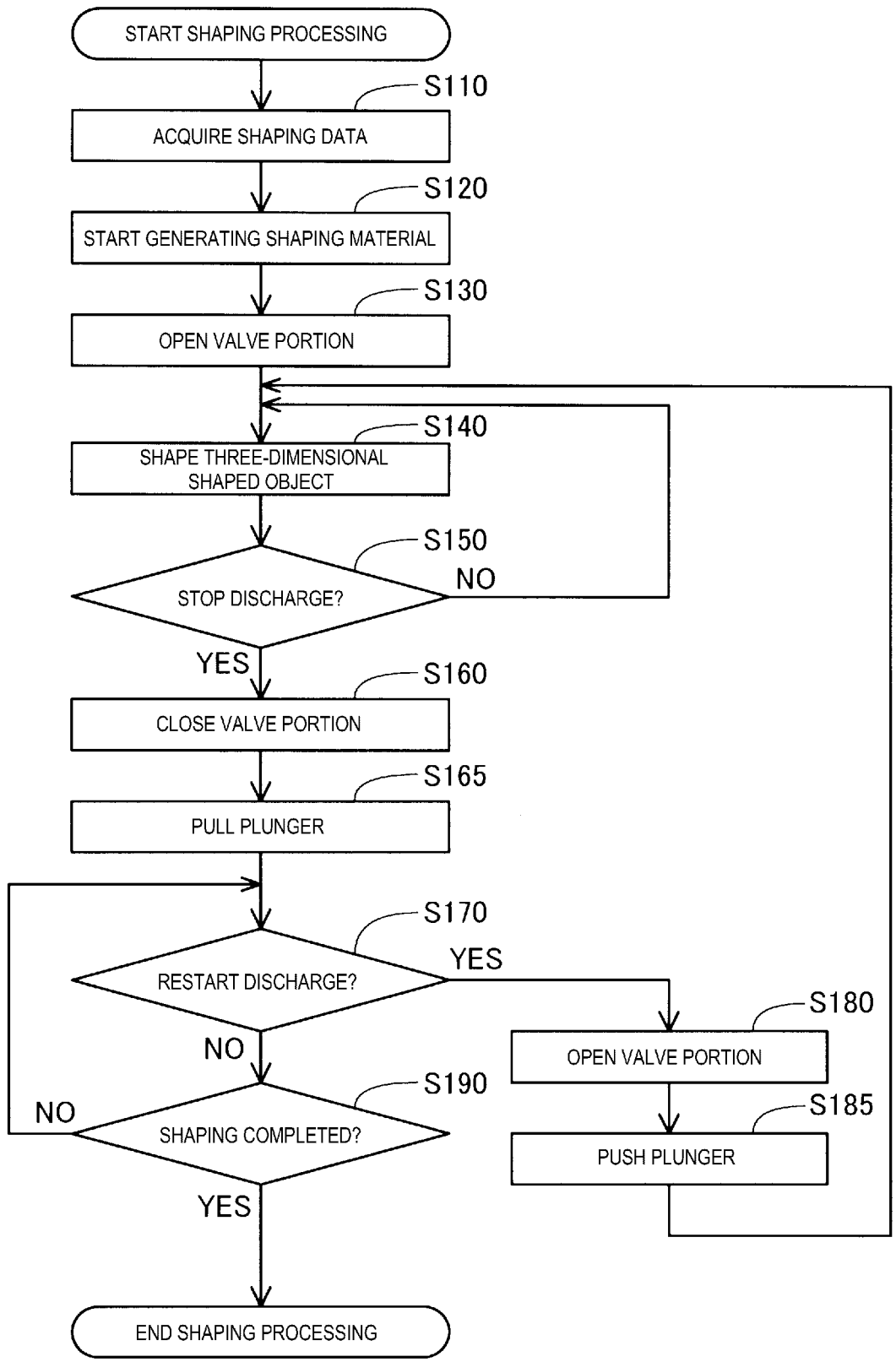
FIG. 11 is a flowchart showing contents of a shaping processing according to the first embodiment.

FIG. 11 is a flowchart showing contents of a shaping processing according to the present embodiment. When a predetermined start operation is performed by a user on an operation panel provided in the three-dimensional shaping device 100 or a computer connected to the three-dimensional shaping device 100, the shaping processing is executed by the control unit 500.

First, in step S110, the control unit 500 acquires shaping data for shaping the three-dimensional shaped object. The shaping data represents information such as a movement path of the nozzle hole 69 with respect to the stage 300, an amount of the shaping material discharged from the nozzle hole 69, a rotation speed of the drive motor 32 for rotating the flat screw 40, and a target temperature of the heater 58 provided in the barrel 50. The shaping data is generated by, for example, slicer software installed in the computer which is coupled to the three-dimensional shaping device 100. The slicer software reads shape data representing a shape of the three-dimensional shaped object created using three-dimensional CAD software or three-dimensional CG software, divides the shape of the three-dimensional shaped object into layers having a predetermined thickness, and generates the shaping data. Data in an STL format or an AMF format can be used for the shape data to be read into the slicer software. The shaping data created by the slicer software is shown with a G code, an M code, or the like. The control unit 500 acquires the shaping data from the computer coupled to the three-dimensional shaping device 100 or a recording medium such as a USB memory.

Next, in step S120, the control unit 500 starts generating a shaping material. The control unit 500 controls the rotation of the flat screw 40 and the temperature of the heater 58 provided in the barrel 50, so as to melt the material and generate the shaping material. By the rotation of the flat screw 40, the material supplied from the material supply unit 20 is introduced into the groove portion 45 from the material introduction port 44 of the flat screw 40. The material introduced into the groove portion 45 is transported along the groove portion 45 to the central portion 47. The material transported in the groove portion 45 is sheared by a relative rotation between the flat screw 40 and the barrel 50, and at least a part of the material is melted by heating with the heater 58 to become the paste-shaped shaping material having fluidity. The shaping material collected in the central portion 47 is supplied to the first flow path 82 by an internal pressure generated in the central portion 47. The valve portion 71 blocks inflow of the shaping material from the first flow path 82 to the second flow path 83. Therefore, a part of the shaping material supplied to the first flow path 82 is stored in the storage chamber RS. The shaping material continues to be generated while the processing is performed.

Thereafter, in step S130, the control unit 500 controls the valve drive unit 101 to rotate the valve portion 71, thereby causing the first flow path 82 and the second flow path 83 to communicate with each other. With the communication between the first flow path 82 and the second flow path 83, the discharge of the shaping material from the nozzle hole 69 is started.

In step S140, the control unit 500 shapes the three-dimensional shaped object by discharging the shaping material from the nozzle hole 69 toward the stage 300 while controlling the moving mechanism 400 to change the relative position between the nozzle hole 69 and the stage 300 according to the shaping data.

In step S150, the control unit 500 determines whether to stop the discharge of the shaping material from the nozzle hole 69. The control unit 500 determines whether to stop the discharge of the shaping material from the nozzle hole 69 based on the shaping data. For example, when a target position where the shaping material is to be discharged is set at a position far from a current position of the nozzle hole 69, the control unit 500 determines to stop the discharge of the shaping material from the nozzle hole 69. When it is determined in step S150 that the discharge of the shaping material from the nozzle hole 69 is not stopped, the control unit 500 returns the processing to step S140 to continue shaping the three-dimensional shaped object.

When it is determined in step S150 that the discharge of the shaping material from the nozzle hole 69 is stopped, in step S160, the control unit 500 controls the valve drive unit 101 to rotate the valve portion 71, so as to block the inflow of the shaping material from the first flow path 82 to the second flow path 83. By blocking the inflow of the shaping material from the first flow path 82 to the second flow path 83, the discharge of the shaping material from the nozzle hole 69 is stopped. In step S165, the control unit 500 controls the plunger drive unit 102 to pull the plunger 93, so as to suck the shaping material in the second flow path 83 into the cylinder 92. Therefore, the discharge of the shaping material from the nozzle hole 69 is immediately stopped. Shaping of the three-dimensional shaped object is stopped while the discharge of the shaping material from the nozzle hole 69 is stopped.

In step S170, the control unit 500 determines whether to restart the discharge of the shaping material from the nozzle hole 69. When it is determined in step S170 that the discharge of the shaping material from the nozzle hole 69 is restarted, in step S180, the control unit 500 controls the valve drive unit 101 to rotate the valve portion 71, thereby causing the first flow path 82 and the second flow path 83 to communicate with each other. In step S185, the control unit 500 controls the plunger drive unit 102 to push the plunger 93, so as to push the shaping material in the cylinder 92 out into the second flow path 83. Therefore, the discharge of the shaping material from the nozzle hole 69 is immediately restarted. Thereafter, the control unit 500 returns the processing to step S140, and shaping of the three-dimensional shaped object is restarted.

When it is determined in step S170 that the discharge of the shaping material from the nozzle hole 69 is not restarted, in step S190, the control unit 500 determines whether the shaping of the three-dimensional shaped object is completed. The control unit 500 can determine whether the shaping of the three-dimensional shaped object is completed based on the shaping data. When it is determined in step S190 that the shaping of the three-dimensional shaped object is not completed, the control unit 500 returns the processing to step S170 and determines again whether to restart the discharge of the shaping material from the nozzle hole 69. On the other hand, when it is determined in step S190 that the shaping of the three-dimensional shaped object is completed, the control unit 500 ends this processing.

Figure 12:
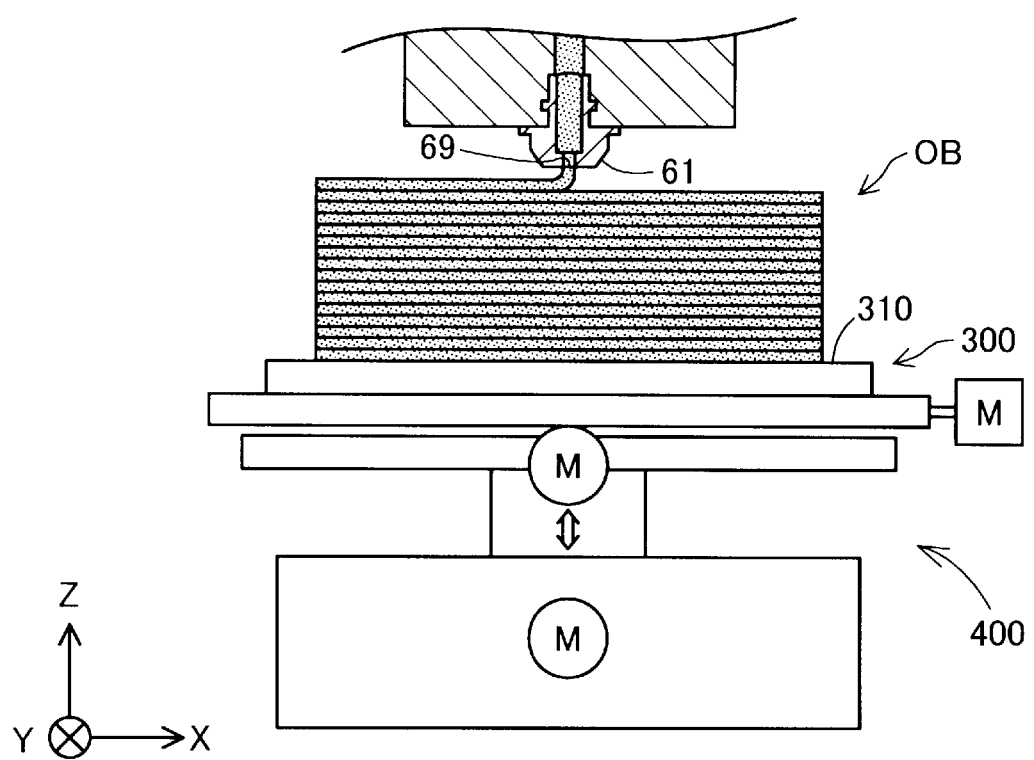
FIG. 12 is a diagram schematically showing a state where a three-dimensional shaped object is shaped.

FIG. 12 is a diagram schematically showing a state where a three-dimensional shaped object OB is shaped. The control unit 500 executes the shaping processing described above, so that the three-dimensional shaped object OB in which a plurality of layers of the shaping material are stacked is shaped on the stage 300.

According to the three-dimensional shaping device 100 of the present embodiment described above, the valve portion 71 is pushed toward the −Y direction by the pressure from the shaping material flowing through the first clearance portion CL1 from the recessed portion 75 toward the tip end portion 73 and stored in the storage chamber RS, so that the first contact surface 77 of the valve portion 71 comes into contact with the second contact surface 87 of the support portion 86, which improves the sealing performance between the first contact surface 77 and the second contact surface 87. Therefore, the shaping material flowing through the second clearance portion CL2 from the recessed portion 75 toward the rear end portion 78 can be prevented from leaking to the outside beyond space between the first contact surface 77 and the second contact surface 87. In particular, according to the present embodiment, since the leakage of the shaping material between the valve portion 71 and the support portion 86 is prevented, it is possible to prevent the rotation of the valve portion 71 from being inhibited due to adhesion of the shaping material to the ball bearing 89 provided between the valve portion 71 and the support portion 86.

According to the present embodiment, the valve portion 71 is provided with the flange portion 76 protruding from between the recessed portion 75 and the rear end portion 78 toward an outer periphery of the valve portion 71, and the first contact surface 77 is provided on the flange portion 76 at the surface of the −Y direction side. Therefore, the flange portion 76 is pushed in the −Y direction by the shaping material flowing through the second clearance portion CL2 from the recessed portion 75 toward the rear end portion 78, so that the sealing performance between the first contact surface 77 and the second contact surface 87 can be further improved.

According to the present embodiment, the three-dimensional shaping device 100 includes the suction portion 90 configured to suck the shaping material from the second flow path 83. Therefore, when the valve portion 71 is rotated to stop the discharge of the shaping material from the nozzle hole 69, the shaping material in the nozzle 61 can be drawn into the second flow path 83 by using the suction portion 90 to suck the shaping material in the second flow path 83. Therefore, threading in which the shaping material extends in a thread-shaped manner between the nozzle hole 69 and the three-dimensional shaped object OB can be prevented.

According to the present embodiment, the three-dimensional shaping device 100 includes the flat screw 40 having a short length along the Z direction, and the material can be plasticized to obtain the shaping material using the rotation of the flat screw 40. Therefore, it is possible to reduce a size of the three-dimensional shaping device 100 in the Z direction.

According to the present embodiment, a pellet-shaped ABS resin is used as the material, whereas as a material used in the shaping unit 200, for example, a material for shaping a three-dimensional shaped object using various materials such as a material having thermoplasticity, a metal material, and a ceramic material as a main material can also be used. Here, the "main material" means a central material for forming a shape of the three-dimensional shaped object, and the material which occupies a content of 50% by weight or more in the three-dimensional shaped object. The above shaping materials include those in which main materials are melted alone, and those in which some of the contained components are melted together with the main materials to form a paste.

When a material having thermoplasticity is used as the main material, a shaping material is generated by plasticizing the material in the plasticization unit 30. The "plasticization" means that a material having thermoplasticity is heated and melted. The "melting" also means that a material having thermoplasticity is softened by being heated to a temperature equal to or higher than a glass transition point, and exhibits fluidity.

As a material having thermoplasticity, for example, a thermoplastic resin material obtained by combining one or more of the following can be used.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyetheretherketone (PEEK)

The material having thermoplasticity may contain pigments, metals, ceramics, and an additive such as a wax, a flame retardant, an antioxidant, and a heat stabilizer. The material having thermoplasticity is plasticized and melted by the rotation of the flat screw 40 and the heating with the heater 58 in the plasticization unit 30. After the shaping material thus generated is discharged from the nozzle hole 69, the shaping material is cured due to a decrease in temperature.

It is desirable that the material having thermoplasticity is discharged from the nozzle holes 69 in a state where the material is heated to a temperature equal to or higher than the glass transition point thereof and is in a state of being completely melted. The "state of being completely melted" means a state where a non-melted material having thermoplasticity does not exist, and means a state where, for example, when a pellet-shaped thermoplastic resin is used as the material, a pellet-shaped solid does not remain.

In the shaping unit 200, for example, the following metal material may be used as a main material instead of the above material having thermoplasticity. In this case, it is desirable that a component to be melted at the time of forming the shaping material is mixed with a powder material obtained by converting the following metal material into powder, and then the mixture is charged into the plasticization unit 30.
Example of Metal Material A single metal of magnesium (Mg), iron (Fe), cobalt (Co) or chromium (Cr), aluminum (Al), titanium (Ti), copper (Cu), and nickel (Ni), or an alloy containing one or more of these metals
Example of Alloy Maraging steel, stainless steel, cobalt chrome molybdenum, titanium alloy, nickel alloy, aluminum alloy, cobalt alloy, and cobalt chromium alloy In the shaping unit 200, a ceramic material can be used as a main material instead of the above metal material. As the ceramic material, for example, oxide ceramics such as silicon dioxide, titanium dioxide, aluminum oxide, and zirconium oxide, and non-oxide ceramics such as aluminum nitride can be used. When the above metal material or ceramic material is used as the main material, the shaping material disposed on the stage 300 may be cured by, for example, sintering with laser irradiation or warm air.

The powder material of the metal material or the ceramic material charged into the material supply unit 20 may be a mixed material obtained by mixing a plurality of types of powders of a single metal powder, an alloy powder, and a ceramic material powder. The powder material of the metal material or the ceramic material may be coated with, for example, the thermoplastic resin shown above or another thermoplastic resin. In this case, the thermoplastic resin may be melted in the plasticization unit 30 to exhibit fluidity.

For example, the following solvents can be added to the powder material of the metal material or the ceramic material charged into the material supply unit 20. The solvent can be used alone or in combination of two or more selected from the following.
Example of Solvent Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, isopropyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders can be added to the powder material of the metal material or the ceramic material charged into the material supply unit 20.
Example of Binder Acrylic resin, epoxy resin, silicone resin, cellulose resin or other synthetic resins, or polylactic acid (PLA), polyamide (PA), polyphenylene sulfide (PPS), polyetheretherketone (PEEK) or other thermoplastic resins

B. Second Embodiment

Figure 13:
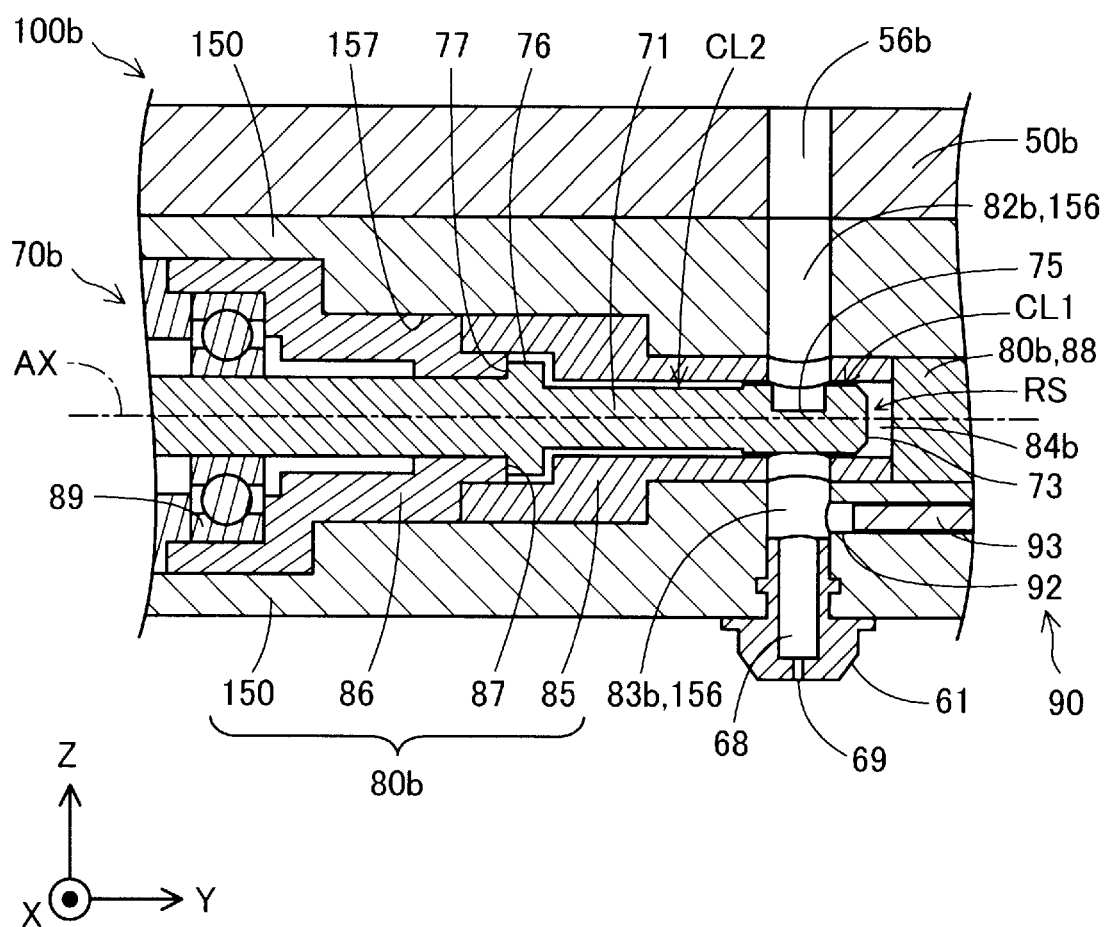
FIG. 13 is a diagram showing a schematic configuration of a three-dimensional shaping device according to a second embodiment.

FIG. 13 is a diagram showing a schematic configuration of a three-dimensional shaping device 100b according to a second embodiment. The three-dimensional shaping device 100b according to the second embodiment is different from the first embodiment in that a flow rate adjusting portion 70b is formed separately from a barrel 50b. Other configurations are the same as those of the first embodiment shown in FIG. 7 unless otherwise specified.

The barrel 50b is provided with a first through hole 56b along the Z direction. According to the present embodiment, unlike the first embodiment, the barrel 50b is not provided with the second through hole 57 shown in FIG. 7.

According to the present embodiment, a valve case 150 is fixed to a lower surface of the barrel 50b. The nozzle 61 is coupled to a lower surface of the valve case 150. The valve case 150 is provided with a third through hole 156 that penetrates the valve case 150 along the Z direction, and a fourth through hole 157 that penetrates the valve case 150 along the Y direction so as to intersect the third through hole 156. The third through hole 156 communicates with the first through hole 56b of the barrel 50b and the nozzle flow path 68.

According to the present embodiment, the valve portion 71, the support portion 86, the sliding portion 85, and the lid portion 88 are accommodated in the fourth through hole 157 of the valve case 150, not inside the barrel 50b. The support portion 86, the sliding portion 85, and the lid portion 88 are fixed to the valve case 150 by press-fitting. According to the present embodiment, a main body portion 80b of the flow rate adjusting portion 70b includes the valve case 150, the lid portion 88, the sliding portion 85, and the support portion 86. According to the present embodiment, in the third through hole 156 of the valve case 150, a portion closer to the screw facing surface 52 than the valve portion 71 is referred to as a first flow path 82b, and a portion farther from the screw facing surface 52 than the valve portion 71 is referred to as a second flow path 83b. The suction portion 90 is coupled to the second flow path 83b in the valve case 150. A cross hole 84b is defined by the inner wall surface of the support portion 86, the inner wall surface of the sliding portion 85, and the lid portion 88 which are accommodated in the fourth through hole 157 of the valve case 150.

According to the three-dimensional shaping device 100b of the present embodiment described above, the shaping material flowing through the second clearance portion CL2 from the recessed portion 75 toward the rear end portion 78 can be prevented from leaking to the outside beyond the space between the first contact surface 77 and the second contact surface 87.

C. Third Embodiment

Figure 14:
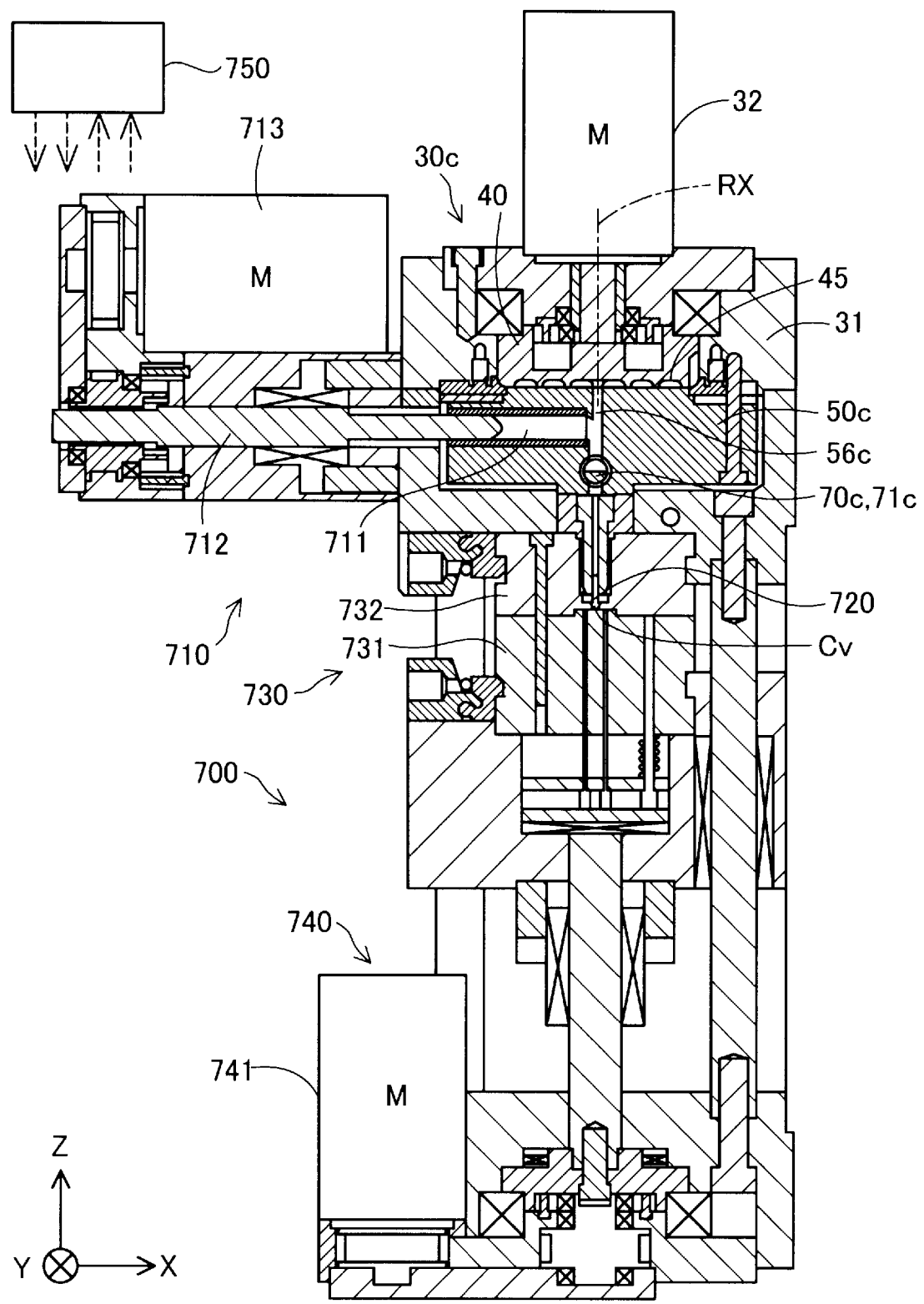
FIG. 14 is a diagram showing a schematic configuration of an injection molding device according to a third embodiment.

FIG. 14 is a diagram showing a schematic configuration of an injection molding device 700 according to a third embodiment. The injection molding device 700 of the present embodiment includes a plasticization unit 30c, an injection control mechanism 710, a nozzle 720, a mold portion 730, and a mold clamping device 740. A configuration of the plasticization unit 30c is the same as that of the first embodiment described with reference to FIGS. 1 and 7, unless otherwise specified.

As described in the first embodiment, the plasticization unit 30c includes the flat screw 40 and a barrel 50c. An injection cylinder 711 to be described later is coupled to a first through hole 56c of the barrel 50c according to the present embodiment. The injection cylinder 711 is coupled to a portion of the first through hole 56c closer to a flat screw 40 side than a valve portion 71c of a flow rate adjusting portion 70c. Under the control of a control unit 750, the plasticization unit 30c plasticizes at least a part of a material supplied to the groove portion 45 of the flat screw 40, generates a molten material with a paste shape and having fluidity, and guides the molten material from the first through hole 56c to the injection control mechanism 710.

The injection control mechanism 710 includes the injection cylinder 711, a plunger 712, and a plunger drive unit 713. The injection control mechanism 710 has a function of injecting the molten material in the injection cylinder 711 into a cavity Cv to be described later. The injection control mechanism 710 controls an injection amount of the molten material from the nozzle 720 under the control of the control unit 750. The injection cylinder 711 is a substantially cylindrical member coupled to the first through hole 56c of the barrel 50c, and includes the plunger 712 therein. The plunger 712 slides inside the injection cylinder 711 and pumps the molten material in the injection cylinder 711 to the nozzle 720 coupled to the plasticization unit 30c. The plunger 712 is driven by the plunger drive unit 713 implemented by a motor.

The mold portion 730 includes a movable mold 731 and a fixed mold 732. The movable mold 731 and the fixed mold 732 are provided to face each other, and the cavity Cv that is space corresponding to a shape of a molded object is formed therebetween. The molten material is pumped to the cavity Cv by the injection control mechanism 710, and is injected via the nozzle 720.

The mold clamping device 740 includes a mold drive unit 741, and has a function of opening and closing the movable mold 731 and the fixed mold 732. Under the control of the control unit 750, the mold clamping device 740 drives the mold drive unit 741 to move the movable mold 731, so as to open and close the mold portion 730.

As described above, the injection molding device 700 according to the present embodiment described above includes the flow rate adjusting portion 70c having the same configuration as that of the first embodiment in the barrel 50c, so that the flow rate of the molten material supplied to the nozzle 720 can be adjusted by a rotation of the valve portion 71c, and the molten material can be prevented from leaking to the outside of the flow rate adjusting portion 70c via the clearance provided such that the valve portion 71c is rotatable. The injection molding device 700 may be provided with the flow rate adjusting portion 70c separately from the barrel 50c. That is, the flow rate adjusting portion 70b described in the second embodiment may be provided between the barrel 50c and the nozzle 720.

Figure 15:
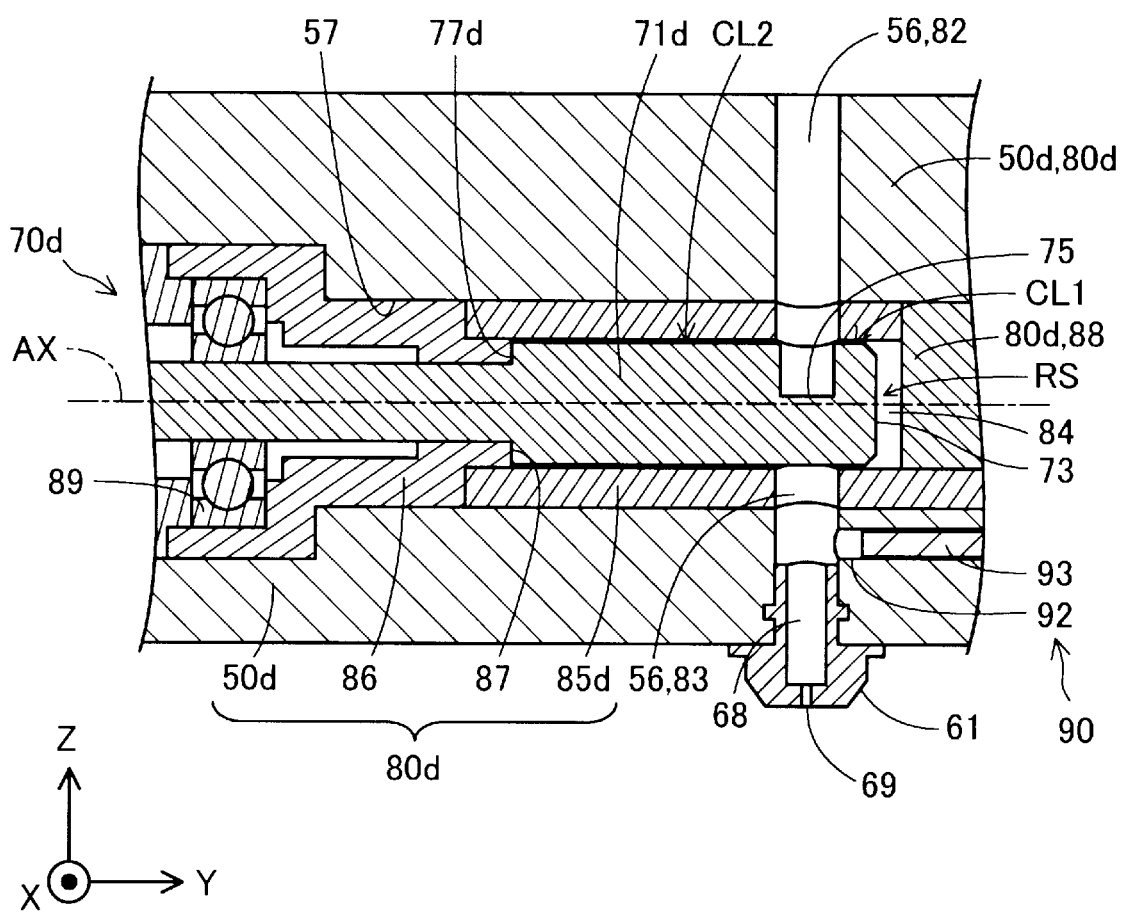
FIG. 15 is a diagram showing a configuration of a flow rate adjusting portion according to other embodiments.

D. Other Embodiments (D1) FIG. 15 is a diagram showing a configuration of a valve portion 71d of a flow rate adjusting portion 70d according to other embodiments. The flow rate adjusting portion 70d shown in FIG. 15 is different from the first embodiment in an aspect of the valve portion 71d, a sliding portion 85d, and a barrel 50d. In other words, the flow rate adjusting portion 70d is different from the first embodiment in an aspect of the valve portion 71d, the sliding portion 85d, and a main body portion 80d. The valve portion 71d may not have the flange portion 76. For example, as shown in FIG. 15, a diameter of a portion of the valve portion 71d accommodated in the sliding portion 85d may be formed larger than a diameter of a portion of the valve portion 71d accommodated in the support portion 86, so that a first contact surface 77d may be provided.

Figure 16:
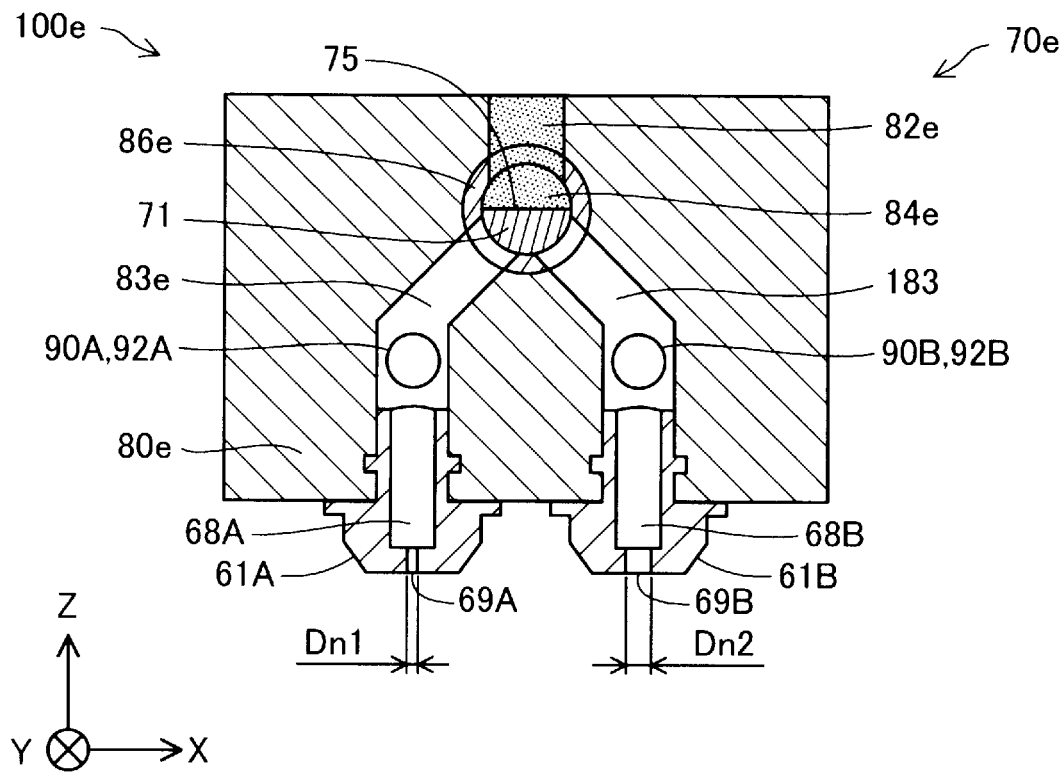
FIG. 16 is a first diagram showing a schematic configuration of a three-dimensional shaping device according to other embodiments.
Figure 17:
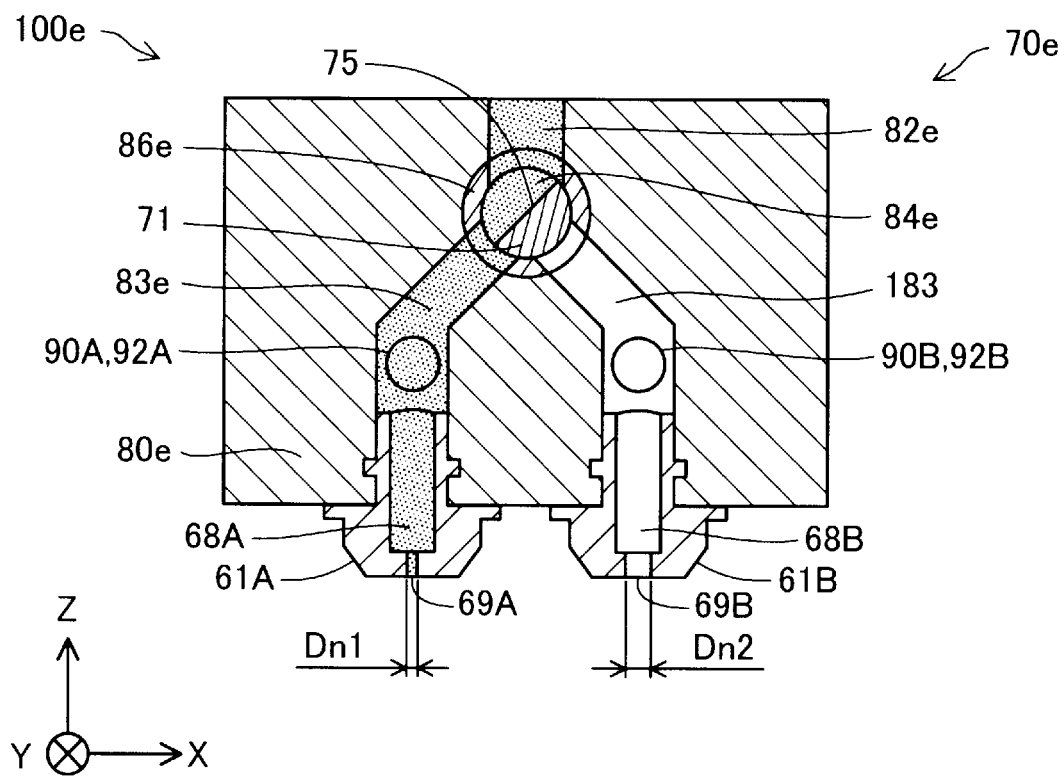
FIG. 17 is a second diagram showing the schematic configuration of the three-dimensional shaping device according to other embodiments.
Figure 18:
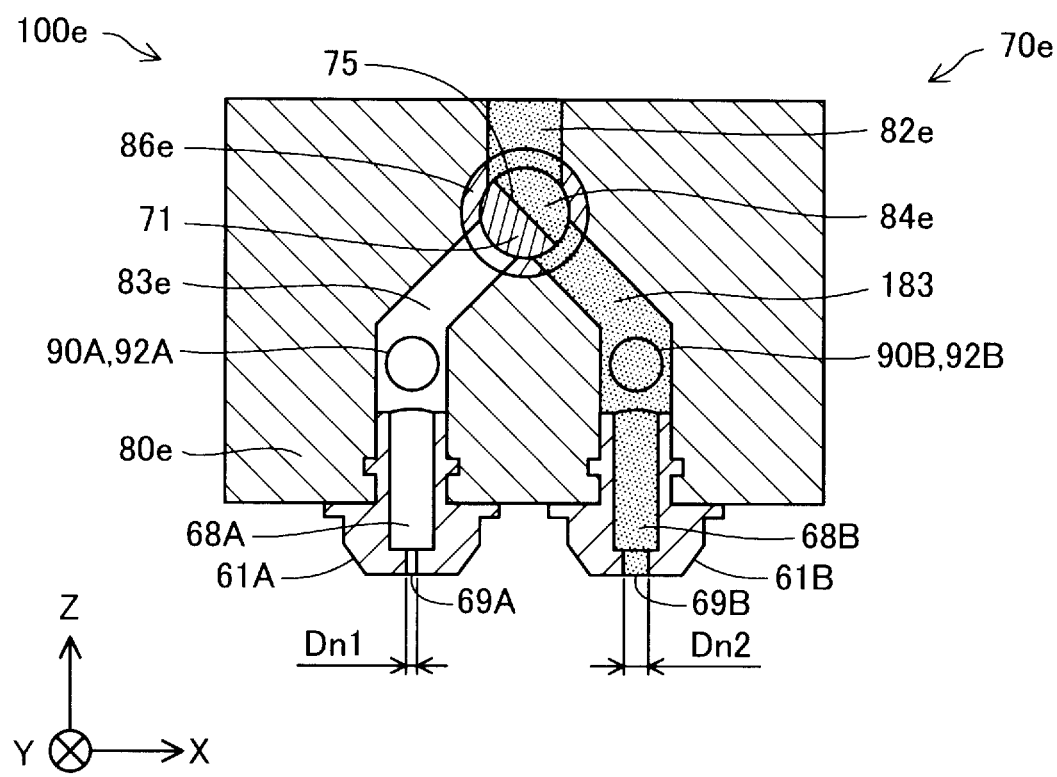
FIG. 18 is a third diagram showing the schematic configuration of the three-dimensional shaping device according to other embodiments.

(D2) FIG. 16 is a first diagram showing a configuration of a three-dimensional shaping device 100e according to other embodiments. FIG. 17 is a second diagram showing the configuration of the three-dimensional shaping device 100e according to other embodiments. FIG. 18 is a third diagram showing the configuration of the three-dimensional shaping device 100e according to other embodiments. The three-dimensional shaping device 100e shown in FIGS. 16 to 18 is different from the first embodiment in that a third flow path 183 is provided in addition to a first flow path 82e and a second flow path 83e in a main body portion 80e of a flow rate adjusting portion 70e. The first flow path 82e extends along the Z direction. The second flow path 83e has a portion extending obliquely with respect to the Z direction from the cross hole 84e, and a portion extending to a lower surface of the main body portion 80e along the Z direction. The third flow path 183 has a portion extending obliquely with respect to the Z direction from the cross hole 84e, and a portion extending to the lower surface of the main body portion 80e along the Z direction. The second flow path 83e is coupled to a first nozzle 61A. The third flow path 183 is coupled to a second nozzle 61B. A nozzle diameter Dn1 of the first nozzle 61A is smaller than a nozzle diameter Dn2 of the second nozzle 61B. The nozzle diameter Dn1 of the first nozzle 61A may be the same as the nozzle diameter Dn2 of the second nozzle 61B. The three-dimensional shaping device 100e is provided with a first suction portion 90A configured to suck the shaping material of the second flow path 83e, and a second suction portion 90B configured to suck the shaping material of the third flow path 183. A first cylinder 92A of the first suction portion 90A is coupled to the second flow path 83e. A second cylinder 92B of the second suction portion 90B is coupled to the third flow path 183. As shown in FIG. 16, when the valve portion 71 rotates such that the recessed portion 75 is located upward, an opening portion of the second flow path 83e and an opening portion of the third flow path 183 are closed by the valve portion 71, and discharge of the shaping material from the first nozzle 61A and from the second nozzle 61B is stopped. As shown in FIG. 17, when the valve portion 71 rotates such that the recessed portion 75 is located obliquely upward to a left side in FIG. 17, the discharge of the shaping material from the first nozzle 61A is started, and the discharge of the shaping material from the second nozzle 61B is stopped. On the other hand, as shown in FIG. 18, when the valve portion rotates such that the recessed portion 75 is located obliquely upward to a right side in FIG. 18, the discharge of the shaping material from the first nozzle 61A is stopped, and the discharge of the shaping material from the second nozzle 61B is started.

(D3) According to the first and second embodiments described above, the three-dimensional shaping devices 100 and 100b may not include the suction portion 90.

(D4) According to the first and second embodiments described above, the three-dimensional shaping devices 100 and 100b may not include the refrigerant pipe 59 and the refrigerant pump 103.

(D5) In the three-dimensional shaping devices 100 and 100b according to the first and second embodiments and the injection molding device 700 according to the third embodiment described above, the plasticization units 30 and 30c include the flat columnar flat screw 40, and barrels 50 to 50c having the flat screw facing surface 52. Also, the plasticization units 30 and 30c may include an inline screw which has a long shaft-shaped outer shape and in which a spiral groove is formed on a side surface of a shaft, and a barrel having a cylindrical screw facing surface.

E. Other Aspects

The present disclosure is not limited to the above-described embodiments, and can be implemented in various aspects without departing from the spirit of the present disclosure. For example, the present disclosure can be implemented by the following aspects. In order to solve some or all of the problems described in the present disclosure, or to achieve some or all of the effects of the present disclosure, technical characteristics in the above embodiments corresponding to the technical characteristics in each of the embodiments described below can be appropriately replaced or combined. If the technical characteristics are not described as essential in the present description, they can be deleted as appropriate.

(1) According to a first aspect of the present disclosure, a flow rate adjusting device is provided. The flow rate adjusting device includes: a main body portion having a first opening portion to which a molten material is supplied, a second opening portion from which the molten material is discharged, a supply flow path communicating with the first opening portion and the second opening portion and through which the molten material flows, and a cross hole intersecting the supply flow path; and a shaft-shaped valve portion disposed inside the cross hole. The valve portion has a tip end portion provided at one end of the valve portion, a rear end portion provided at the other end of the valve portion, and a recessed portion provided between the tip end portion and the rear end portion and communicating with the first opening portion and the second opening portion, and the valve portion is rotated in the cross hole to change a position of the recessed portion, such that a flow path cross-sectional area of the supply flow path is changed to adjust a flow rate of the molten material discharged from the second opening portion. A storage chamber storing a part of the molten material flowing through the supply flow path between the first opening portion and the valve portion is defined by the tip end portion and an inner wall surface of the cross hole. The valve portion has a first contact surface provided between the recessed portion and the rear end portion and facing the rear end portion side. The main body portion has a second contact surface to come into contact with the first contact surface from the tip end portion side.

According to the flow rate adjusting device of the aspect, the valve portion is pushed by pressure from the molten material stored in the storage chamber flowing through a clearance between the valve portion and the main body portion from the recessed portion toward the tip end portion, and the first contact surface comes into contact with the second contact surface, so that sealing performance between the first contact surface and the second contact surface is improved. Therefore, the molten material flowing through a clearance between the valve portion and the main body portion from the recessed portion toward the rear end portion can be prevented from leaking to an outside beyond space between the first contact surface and the second contact surface.

(2) In the flow rate adjusting device according to the above aspect, the valve portion has a flange portion provided between the recessed portion and the rear end portion, and the first contact surface may be provided on the flange portion.

According to the flow rate adjusting device of the aspect, the flange portion is pushed by the molten material flowing through the clearance between the valve portion and the main body portion from the recessed portion toward the rear end portion, so that the sealing performance between the first contact surface and the second contact surface can be further improved.

(3) According to a second aspect of the present disclosure, a three-dimensional shaping device is provided. The three-dimensional shaping device includes a plasticization unit configured to plasticize a material into a molten material; and a nozzle configured to discharge the molten material supplied from the plasticization unit toward a stage. The plasticization unit includes: a flow rate adjusting port ion configured to adjust a flow rate of the molten material supplied to the nozzle. The flow rate adjusting portion includes: a main body portion having a first opening portion to which the molten material is supplied, a second opening portion communicating with the nozzle and from which the molten material is discharged, a supply flow path communicating with the first opening portion and the second opening portion and through which the molten material flows, and a cross hole intersecting the supply flow path; and a shaft-shaped valve portion disposed inside the cross hole. The valve portion has a tip end portion provided at one end of the valve portion, a rear end portion provided at the other end of the valve portion, and a recessed portion provided between the tip end portion and the rear end portion and communicating with the first opening portion and the second opening portion, and the valve portion is rotated in the cross hole to change a position of the recessed portion, such that a flow path cross-sectional area of the supply flow path is changed to adjust a flow rate of the molten material discharged from the second opening portion. A storage chamber storing a part of the molten material flowing through the supply flow path between the first opening portion and the valve portion is defined by the tip end portion and an inner wall surface of the cross hole. The valve portion has a first contact surface provided between the recessed portion and the rear end portion and facing a rear end portion side. The main body portion has a second contact surface to come into contact with the first contact surface from a tip end portion side.

According to the three-dimensional shaping device of the aspect, the valve portion is pushed by pressure from the molten material flowing through a clearance between the valve portion and the main body portion from the recessed portion toward the tip end portion and stored in the storage chamber, and the first contact surface comes into contact with the second contact surface, so that sealing performance between the first contact surface and the second contact surface is improved. Therefore, the molten material flowing through a clearance between the valve portion and the main body portion from the recessed portion toward the rear end portion can be prevented from leaking to an outside beyond space between the first contact surface and the second contact surface.

(4) The three-dimensional shaping device according to the above aspect may include a suction portion configured to suck the molten material from the supply flow path between the valve portion and the second opening portion.

According to the three-dimensional shaping device of the aspect, the molten material in the nozzle can be drawn into the supply flow path between the valve portion and the second opening portion by using the suction portion to suck the shaping material into the supply flow path. Therefore, threading in which the molten material extends in a thread-shaped manner between a nozzle hole and a three-dimensional shaped object can be prevented.

(5) In the three-dimensional shaping device according to the above aspect, the plasticization unit may include a flat screw having a groove forming surface formed with a groove to which the material is supplied, and a heating portion configured to heat the material supplied to the groove; the main body portion may have a facing surface facing the groove forming surface; and the first opening portion may be provided on the facing surface.

According to the three-dimensional shaping device of the aspect, since the material can be plasticized using a small flat screw, it is possible to reduce a size of the three-dimensional shaping device.

(6) According to a third aspect of the present disclosure, an injection molding device is provided. The injection molding device includes a plasticization unit configured to plasticize a material into a molten material; a nozzle configured to inject the molten material supplied from the plasticization unit into a mold; and a flow rate adjusting portion provided between the plasticization unit and the nozzle. The flow rate adjusting portion includes: a main body portion having a first opening portion to which the molten material is supplied from the plasticization unit, a second opening portion communicating with the nozzle and from which the molten material is discharged, a supply flow path communicating with the first opening portion and the second opening portion and through which the molten material flows, and a cross hole intersecting the supply flow path; and a shaft-shaped valve portion disposed inside the cross hole. The valve portion has a tip end portion provided at one end of the valve portion, a rear end portion provided at the other end of the valve portion, and a recessed portion provided between the tip end portion and the rear end portion and communicating with the first opening portion and the second opening portion, and the valve portion is rotated in the cross hole to change a position of the recessed portion, such that a flow path cross-sectional area of the supply flow path is changed to adjust a flow rate of the molten material discharged from the second opening portion. A storage chamber storing a part of the molten material flowing through the supply flow path between the first opening portion and the valve portion is defined by the tip end portion and an inner wall surface of the cross hole. The valve portion has a first contact surface provided between the recessed portion and the rear end portion and facing the rear end portion side. The main body portion has a second contact surface to come into contact with the first contact surface from the tip end portion side.

According to the injection molding device of the aspect, the valve portion is pushed by pressure from the molten material flowing through a clearance between the valve portion and the main body portion from the recessed portion toward the tip end portion and stored in the storage chamber, and the first contact surface comes into contact with the second contact surface, so that sealing performance between the first contact surface and the second contact surface is improved. Therefore, the molten material flowing through a clearance between the valve portion and the main body portion from the recessed portion toward the rear end portion can be prevented from leaking to an outside beyond space between the first contact surface and the second contact surface.

The present disclosure may also be implemented in various forms other than the flow rate adjusting device. For example, the present disclosure can be implemented in the form of a plasticization device, a three-dimensional shaping device, or an injection molding device.

What is claimed is:

1. A flow rate adjusting device, comprising:
   a main body portion having a first opening portion to which a molten material is supplied, a second opening portion from which the molten material is discharged, a supply flow path communicating with the first opening portion and the second opening portion and through which the molten material flows, and a cross hole intersecting the supply flow path; and
   a shaft-shaped valve portion disposed inside the cross hole, wherein
   the valve portion has a tip end portion provided at one end of the valve portion, a rear end portion provided at the other end of the valve portion, and a recessed portion provided between the tip end portion and the rear end portion and communicating with the first opening portion and the second opening portion, and the valve portion is rotated in the cross hole to change a position of the recessed portion, such that a flow path cross-sectional area of the supply flow path is changed to adjust a flow rate of the molten material discharged from the second opening portion,
   a storage chamber storing a part of the molten material flowing through the supply flow path between the first opening portion and the valve portion is defined by the tip end portion and an inner wall surface of the cross hole,
   the valve portion has a first contact surface provided between the recessed portion and the rear end portion and facing the rear end portion side,
   the main body portion has a second contact surface to come into contact with the first contact surface from the tip end portion side,
   the valve portion has a flange portion provided between the recessed portion and the rear end portion, and
   the first contact surface is provided on the flange portion.

2. A three-dimensional shaping device, comprising:
   a plasticization unit configured to plasticize a material into a molten material; and
   a nozzle configured to discharge the molten material supplied from the plasticization unit toward a stage, wherein
   the plasticization unit includes a flow rate adjusting portion configured to adjust a flow rate of the molten material supplied to the nozzle,
   the flow rate adjusting portion includes:
   a main body portion having a first opening portion to which the molten material is supplied, a second opening portion communicating with the nozzle and from which the molten material is discharged, a supply flow path communicating with the first opening portion and the second opening portion and through which the molten material flows, and a cross hole intersecting the supply flow path; and
   a shaft-shaped valve portion disposed inside the cross hole, the valve portion has a tip end portion provided at one end of the valve portion, a rear end portion provided at the other end of the valve portion, and a recessed portion provided between the tip end portion and the rear end portion and communicating with the first opening portion and the second opening portion, and the valve portion is rotated in the cross hole to change a position of the recessed portion, such that a flow path cross-sectional area of the supply flow path is changed to adjust a flow rate of the molten material discharged from the second opening portion, a storage chamber storing a part of the molten material flowing through the supply flow path between the first opening portion and the valve portion is defined by the tip end portion and an inner wall surface of the cross hole, the valve portion has a first contact surface provided between the recessed portion and the rear end portion and facing the rear end portion side, the main body portion has a second contact surface to come into contact with the first contact surface from the tip end portion side, the valve portion has a flange portion provided between the recessed portion and the rear end portion, and the first contact surface is provided on the flange portion.

3. The three-dimensional shaping device according to claim 2, further comprising:

a suction portion configured to suck the molten material from the supply flow path between the valve portion and the second opening portion.

4. The three-dimensional shaping device according to claim 2, wherein the plasticization unit includes a flat screw having a groove forming surface formed with a groove to which the material is supplied, and a heating portion configured to heat the material supplied to the groove, the main body portion has a facing surface facing the groove forming surface, and the first opening portion is provided on the facing surface.

5. An injection molding device, comprising:

a plasticization unit configured to plasticize a material into a molten material;

a nozzle configured to inject the molten material supplied from the plasticization unit into a mold; and a flow rate adjusting portion provided between the plasticization unit and the nozzle, wherein the flow rate adjusting portion includes:

a main body portion having a first opening portion to which the molten material is supplied from the plasticization unit, a second opening portion communicating with the nozzle and from which the molten material is discharged, a supply flow path communicating with the first opening portion and the second opening portion and through which the molten material flows, and a cross hole intersecting the supply flow path; and a shaft-shaped valve portion disposed inside the cross hole, the valve portion has a tip end portion provided at one end of the valve portion, a rear end portion provided at the other end of the valve portion, and a recessed portion provided between the tip end portion and the rear end portion and communicating with the first opening portion and the second opening portion, and the valve portion is rotated in the cross hole to change a position of the recessed portion, such that a flow path cross-sectional area of the supply flow path is changed to adjust a flow rate of the molten material discharged from the second opening portion, a storage chamber storing a part of the molten material flowing through the supply flow path between the first opening portion and the valve portion is defined by the tip end portion and an inner wall surface of the cross hole, the valve portion has a first contact surface provided between the recessed portion and the rear end portion and facing the rear end portion side, the main body portion has a second contact surface to come into contact with the first contact surface from the tip end portion side, the valve portion has a flange portion provided between the recessed portion and the rear end portion, and the first contact surface is provided on the flange portion.

\* \* \* \* \*